United States Patent
Kitagawa

(10) Patent No.: US 8,198,843 B2
(45) Date of Patent: Jun. 12, 2012

(54) MOTOR CONTROL APPARATUS AND MOTOR CONTROL METHOD

(75) Inventor: Takayuki Kitagawa, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 481 days.

(21) Appl. No.: 12/457,350

(22) Filed: Jun. 9, 2009

(65) Prior Publication Data

US 2009/0309535 A1    Dec. 17, 2009

(30) Foreign Application Priority Data

Jun. 17, 2008 (JP) .................. 2008-158270
Jun. 18, 2008 (JP) .................. 2008-159256

(51) Int. Cl.
*H02P 29/02* (2006.01)

(52) U.S. Cl. .............. 318/400.06; 318/684; 318/490

(58) Field of Classification Search .......... 318/624, 318/679, 684, 400.06, 440, 442, 448, 452–456, 318/478, 479, 500, 504, 490
See application file for complete search history.

(56) References Cited

U.S. PATENT DOCUMENTS

| | | | | |
|---|---|---|---|---|
| 3,786,362 A | * | 1/1974 | Marsh et al. | 330/258 |
| 4,048,575 A | * | 9/1977 | Musa | 330/253 |
| 4,417,216 A | * | 11/1983 | Davis | 330/294 |
| 4,749,922 A | * | 6/1988 | Hoppe et al. | 318/257 |
| 5,001,407 A | * | 3/1991 | Suzuki et al. | 318/268 |
| 5,182,511 A | * | 1/1993 | Pierret et al. | 324/545 |
| 6,274,991 B1 | * | 8/2001 | Busch | 318/400.32 |
| 6,359,408 B1 | * | 3/2002 | Tyckowski | 318/469 |
| 7,813,847 B2 | * | 10/2010 | Sogihara | 701/19 |
| 2004/0169968 A1 | | 9/2004 | Mohr et al. | |
| 2009/0102408 A1 | * | 4/2009 | De Jesus et al. | 318/466 |

FOREIGN PATENT DOCUMENTS

JP    A-2006-320164    11/2006

* cited by examiner

*Primary Examiner* — Bentsu Ro
(74) *Attorney, Agent, or Firm* — Posz Law Group, PLC

(57) ABSTRACT

A first duty ratio of a drive command signal is computed by comparing a level of the drive command signal with a first threshold value at a motor controller of a blower motor apparatus. A second duty ratio of the drive command signal is computed by comparing the level of the drive command signal with a second threshold value at the motor controller. A control signal is generated based on the first duty ratio and the second duty ratio in the motor controller and is used to drive a blower motor of the blower motor apparatus.

9 Claims, 15 Drawing Sheets

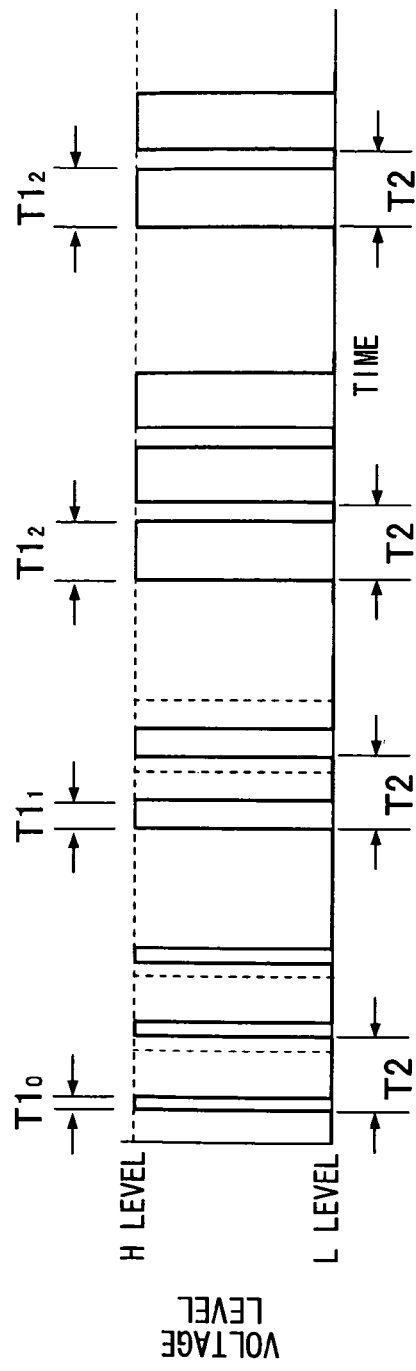
FIG. 11A  NORMAL CONTROL (SOFT START)  $\alpha = \dfrac{T1_2}{T2}$
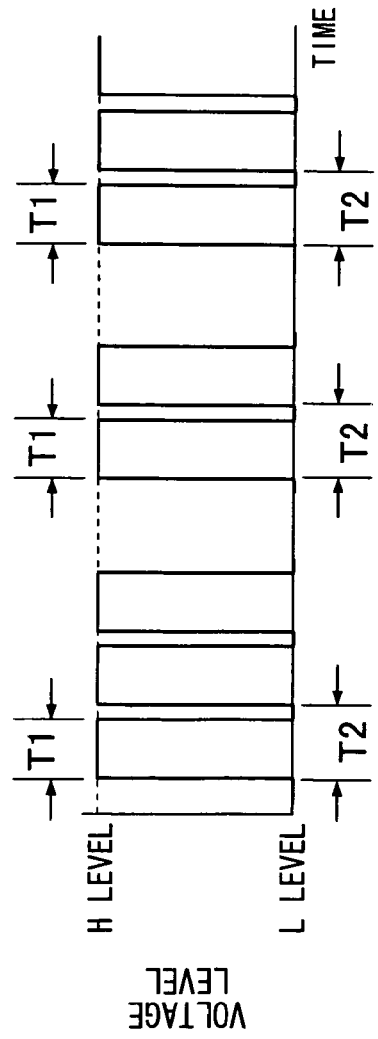
FIG. 11B  INSPECTION MODE  $\beta = \dfrac{T1}{T2}$

NORMAL CONTROL (SOFT START)

INSPECTION MODE

MOTOR CONTROL APPARATUS AND MOTOR CONTROL METHOD

CROSS REFERENCE TO RELATED APPLICATION

This application is based on and incorporates herein by reference Japanese Patent Application No. 2008-158270 filed on Jun. 17, 2008 and Japanese Patent Application No. 2008-159256 filed on Jun. 18, 2008.

BACKGROUND OF THE INVENTION

1. Field of the Invention

The present invention relates to a motor control apparatus and a motor control method.

2. Description of Related Art

A motor control apparatus, which controls rotation of an electric motor, is known (see, for example, Japanese Unexamined Patent Publication No. 2006-320164A). In general, in a case of a motor control apparatus (motor controller) of an air conditioning system, as shown in FIG. 15, when a drive command signal S1 for driving an electric motor 72 is received from an air conditioning electronic control unit (ECU) 70, the motor control apparatus drives the motor 72 according to the received drive signal S1. As shown in FIG. 16, the air conditioning ECU 70 includes an output device 74. The output device 74 is a circuit that includes an NPN transistor 76. An emitter terminal of the transistor 76 is grounded, and a collector terminal of the transistor 76 is connected to one end of a command signal line 80 through a resistor 78. A motor controller (a motor control apparatus) 84 of a blower motor apparatus 82 is connected to the other end of the command signal line 80. In this way, as shown in FIG. 16, the air conditioning ECU 70 and the motor controller 84 are electrically interconnected.

Furthermore, a base terminal of the transistor 76 is connected to a signal generating circuit (not shown), which generates the command signal (ECU output) for driving the motor 72 based on a manipulation signal received from a manipulation switch at the air conditioning ECU 70. Thereby, the base terminal of the transistor 76 receives the command signal (ECU output), which is generated at the air conditioning ECU 70 based on the manipulation signal received from the manipulation switch to drive the motor 72. When the low level signal is supplied to the base terminal of the transistor 76, the electrical conduction between the collector terminal and the emitter terminal of the transistor 76 is turned off (placed in a non-conductive state). When the high level signal is supplied to the base terminal of the transistor 76, the electrical conduction between the collector terminal and the emitter terminal of the transistor 76 is turned on (placed in a conductive state).

In the motor controller 84, the other end of the command signal line 80 is connected to a connection terminal 88 through a resistor 86. A pull-up resistor 90 has one end connected to an electric power source (e.g., an electric power source of 5 V) and the other end connected to the connection terminal 88. Furthermore, a non-inverting input terminal of a comparator 3 is connected to the connection terminal 88. A voltage of a first predetermined value (first threshold value), for example, of 2.5V is supplied to the inverting input terminal of the comparator 3 as a comparative reference voltage. An output terminal of the comparator 3 is connected to an input terminal of a rotation control circuit 92. The comparator 3 compares the first threshold value with an S1 electric potential (electric potential at the connection terminal 88). When the S1 electric potential is equal to or larger than the first threshold value, the high level signal is outputted from the output terminal of the comparator 3. In contrast, when the S1 electric potential is smaller than the first threshold value, the low level signal is outputted from the output terminal of the comparator 3.

A duty ratio of the signal, which is outputted from the output terminal of the comparator 3, is computed as a duty ratio of the drive command signal S1 at the rotation control circuit 92, and the computed duty ratio is used to control the rotation of the motor 72.

Under an ideal circumstance where a disturbance, such as external radio wave radiation (e.g., radio wave radiation from a transceiver, which generates the radio wave), does not exist, when the signal (ECU output) 94 shown in FIG. 17A is supplied to the base terminal of the transistor 76, there is provided the S1 electric potential (electric potential at the connection terminal 88) shown in FIG. 17B. In such a case, the first threshold value, which is used to compute the duty ratio for controlling the rotation of the motor 72, is experimentally obtained and is preset based on the S1 electric potential. Thereby, for example, a period, during which the S1 electric potential is equal to or larger than the first threshold value, may be set as an on-period. Also, a period, during which the S1 electric potential is smaller than the first threshold value, may be set as an off-period. In this way, it is possible to compute the duty ratio for driving the motor 72 based on the S1 electric potential (i.e., the drive command signal S1) and the first threshold value. In the exemplary case of FIGS. 16 and 17B, the first threshold value 98 is set to, for example, 2.5 V.

Furthermore, in the presence of the disturbance, such as the external radio wave radiation, when the signal 96 of FIG. 18A (the signal, which is the same as the signal 94) is supplied to the base terminal of the transistor 76, the S1 electric potential may possibly entirely become below the first threshold value 98, as shown in FIG. 18B. This incidence is most likely caused by the following reason. That is, for example, when the external radio wave is applied to at least one of the command signal line 80 and the air conditioning ECU 70, the electric voltage is applied between the base terminal and the emitter terminal of the transistor 76 of the air conditioning ECU 70. Thereby, even when the signal, which is outputted to turn off the transistor 76, is supplied to the base terminal of the transistor 76, the voltage between the base terminal and the emitter terminal of the transistor 76 does not become 0 V, so that the transistor 76 is placed in the state where the transistor 76 is not completely turned off, i.e., is placed in a low on-state. In such a case, even when the first threshold value 98 is used, it is not possible to accurately compute the duty ratio for driving the motor 72 based on the S1 electric potential. Specifically, in this state where the inverting input terminal of the comparator 3 receives the first threshold value 98 while the non-inverting input terminal of the comparator 3 is connected to the connection terminal 88, when the duty ratio is computed based on the S1 electric potential by using the signal outputted from the output terminal of the comparator 3, the computed duty ratio becomes 0%. Therefore, the motor controller 84 controls the motor 72 such that the motor 72 is not rotated. As discussed above, when the disturbance, such as the external radio wave radiation, exists, the appropriate motor control cannot be performed. In order to address the above disadvantage, for example, a harness having a shield structure may be used for the command signal line 80, or a ferrite bead may be added to improve a radio wave resistance. However, these solutions pose a disadvantage of cost increase.

Furthermore, the motor control apparatus recited in Japanese Unexamined Patent Publication No. 2006-320164A has a soft start function to execute soft start of the electric motor. Also, an inspection apparatus is connectable to the motor control apparatus to inspect the maximum output of the motor. In the motor control apparatus, an external signal determining means determines whether a received drive command signal is a normal operation motor drive command signal or a motor inspection drive command signal. The normal operation motor drive command signal is for commanding a normal operation of the motor, and the motor inspection drive command signal is for commanding the motor inspection operation. This determination process will be described more specifically. The external signal determining means computes a pulse interval, a pulse width, a duty ratio and a frequency of the received signal. When the external signal determining means determines that a frequency f1 (1/T2) and a frequency f2 (1/TC) are alternately repeated in the received signal, the external signal determining means determines that the motor inspection command signal is received. The above determination process is executed by a microcomputer in the motor control apparatus recited in Japanese Unexamined Patent Publication No. 2006-320164A.

However, for example, in the above determination process that senses whether the signal has the frequency f1 and the frequency f2, which are alternately repeated, it requires the relatively long time until the time of making the determination of that the motor inspection command signal is received. That is, due to the relatively long time required for making the determination, the inspection time period is disadvantageously lengthened.

SUMMARY OF THE INVENTION

The present invention addresses the above disadvantages. Thus, it is an objective of the present invention to provide a motor control apparatus and a motor control method, which implements an improved motor control operation of an electric motor.

To achieve the objective of the present invention, there is provided a motor control apparatus, which includes a determining means, a control signal generating means and a drive means. The determining means is for determining at least one characteristic of a drive command signal. Which is pulsed and specifies a target rotational speed of the electric motor, by comparing a level of the drive command signal with a plurality of threshold values. The control signal generating means is for generating a control signal based on the at least one characteristic of the drive command signal, which is determined by the determining means. The drive means is for driving the electric motor based on the control signal, which is generated by the control signal generating means.

To achieve the objective of the present invention, there is also provided a motor control method. According to the motor control method, there is determined at least one characteristic of a drive command signal, which is pulsed and specifies a target rotational speed of an electric motor, by comparing a level of the drive command signal with a plurality of threshold values. Then, a control signal is generated based on the at least one characteristic of the drive command signal. Thereafter, the electric motor is driven based on the control signal.

BRIEF DESCRIPTION OF THE DRAWINGS

The invention, together with additional objectives, features and advantages thereof, will be best understood from the following description, the appended claims and the accompanying drawings in which:

FIGS. 11A and 11B are descriptive diagrams showing a change in a control signal according to the second embodiment;

DETAILED DESCRIPTION OF THE INVENTION

Figure 1:
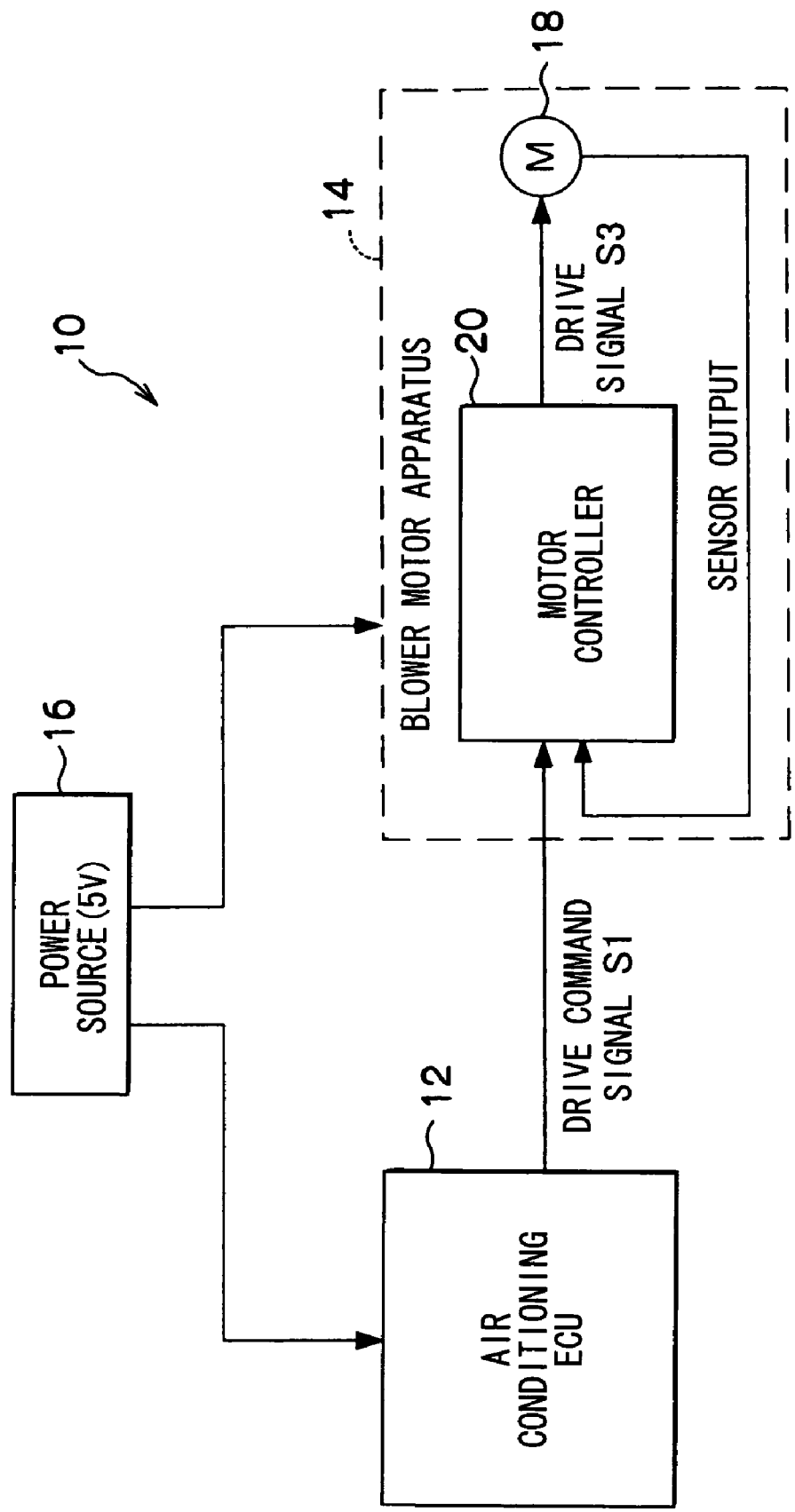
FIG. 1 is a block diagram schematically showing a structure of an air conditioning system according to a first embodiment of the present invention.

A motor control apparatus according to a first embodiment of the present invention will be described with reference to FIGS. 1 to 8. The motor control apparatus of the present embodiment is implemented in a blower motor apparatus of an air conditioning system of a vehicle. As shown in FIG. 1, the air conditioning system 10 of the present embodiment includes an air conditioning electronic control unit (ECU) 12 and the blower motor apparatus 14. The air conditioning ECU 12 and the blower motor apparatus 14 are operated upon receiving an electric power from an electric power source 16 of, for example, 5V.

The air conditioning ECU 12 (air conditioning control device) provides a drive command signal (motor drive command signal) S1 to the blower motor apparatus 14 based on a manipulation signal received from a manipulation switch (not shown), which is manipulated by a user. In the present embodiment, the blower motor apparatus 14 is constructed to perform its normal operation based on this drive command signal S1. Furthermore, in the present embodiment, the drive command signal S1 has a pulse generated at a corresponding duty ratio, which corresponds to a target rotational speed, thereby specifying the target rotational speed of an electric motor 18. For example, the duty ratio is increased when the target rotational speed is increased.

The blower motor apparatus 14 includes the motor 18 and a motor controller (motor control apparatus) 20. A fan (not shown) is installed to an output shaft of the motor 18. The motor controller 20 outputs a drive signal S3 to the motor 18.

When the motor controller 20 receives the drive command signal S1 from the air conditioning ECU 12, the motor controller 20 outputs the drive signal S3 to the motor 18 to drive the motor 18. That is, the motor controller 20 controls the rotation of the motor 18.

The motor 18 of the present embodiment is a brushless motor and is controlled to rotate at the corresponding rotational speed, which corresponds to the duty ratio, upon receiving the rectangular wave voltage signal of the predetermined duty ratio from the motor controller 20. In the present embodiment, the motor 18 is the brushless motor having a Hall sensor (not shown). However, the motor 18 of the present invention is not limited to the brushless motor and may be changed to any other appropriate type of motor. For example, the motor 18 may be a brush motor having a commutator.

Figure 2:
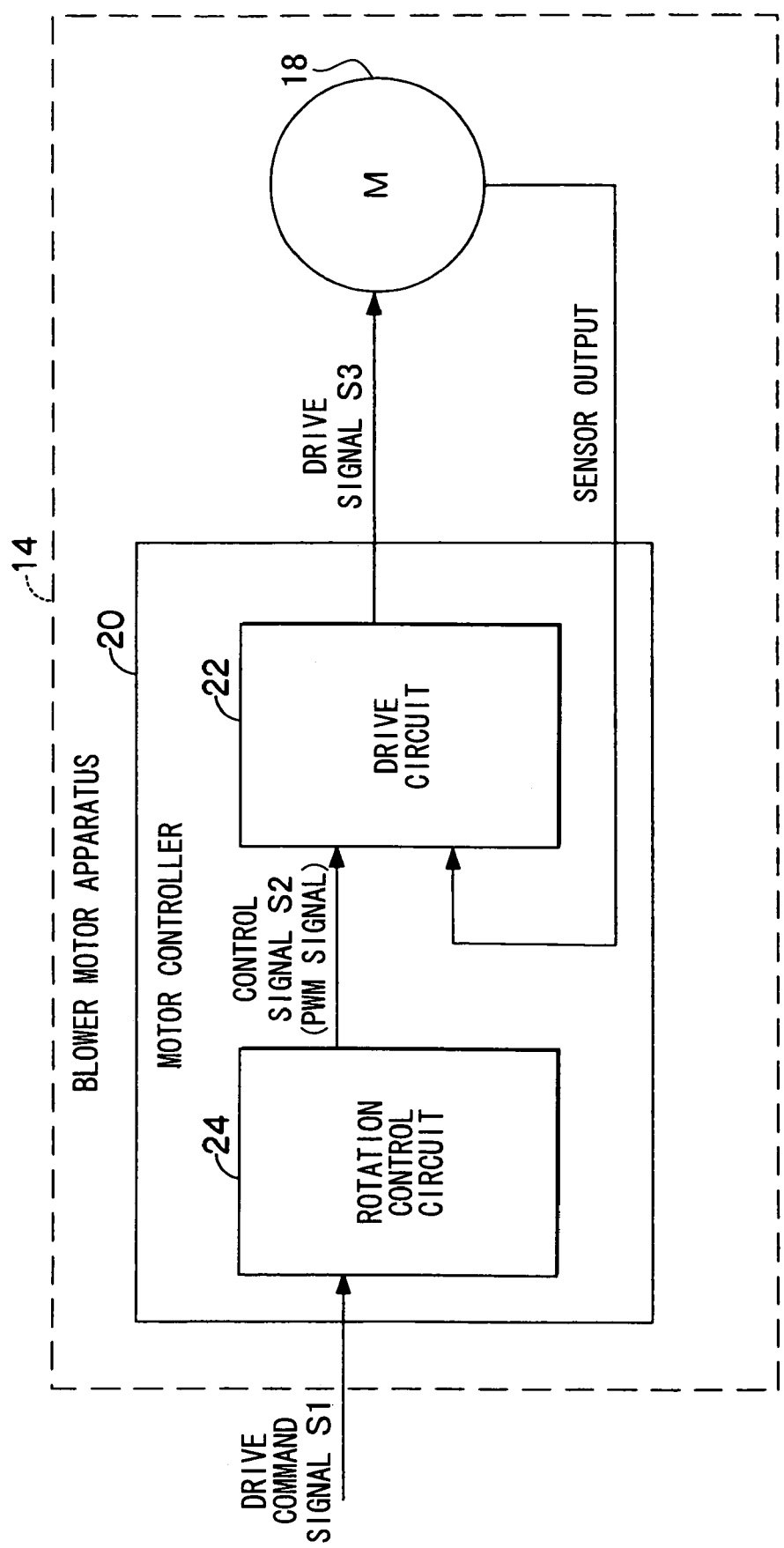
FIG. 2 is a structural diagram showing a blower motor apparatus according to the first embodiment.

The motor 18 of the present embodiment includes a stator (not shown) and a rotor (not shown). The stator has windings of three phases. The rotor has rotor magnets. The Hall sensor (not shown) is provided in the stator. As shown in FIG. 2, the Hall sensor senses the rotation of the rotor and outputs a corresponding sensor output, which corresponds to the rotation of the rotor, to a drive circuit 22 of the motor controller 20. In this way, the known feedback control of the motor controller 20 is executed.

As shown in FIG. 2, the motor controller 20 of the present embodiment includes a rotation control circuit 24 and the drive circuit 22. The rotation control circuit 24 generates and outputs a control signal (PWM signal) S2 of a corresponding duty ratio, which is determined based on an input signal (the drive command signal S1 in the present embodiment) received from the outside. The drive circuit 22 supplies the rectangular wave voltage signals (drive signals S3) of different phases to the windings of the three phases, respectively, of the motor 18 based on the control signal S2 and the sensor output of the Hall sensor.

The rotation control circuit 24 of the present embodiment includes one or more custom integrated circuits (ICs) and outputs the control signal S2 to achieve the corresponding motor rotational speed, which is a target value that is set by the drive command signal S1.

The drive circuit 22 of the present embodiment is of a known construction and includes, for example, a predetermined number (e.g., six) of resistors (not shown) and a predetermined number (e.g., six) of power elements (not shown) arranged on a circuit board. The drive circuit 22 turns on and off these power elements based on the control signal S2 received from the rotation control circuit 24 to connect the electric power source 16 to the windings and thereby to generate the rotating magnetic field. That is, the drive circuit 22 controls the rotation of the motor 18 based on the control signal S2. At this time, the feedback control is executed based on the sensor output from the Hall sensor to appropriately rotate the motor 18.

Figure 3:
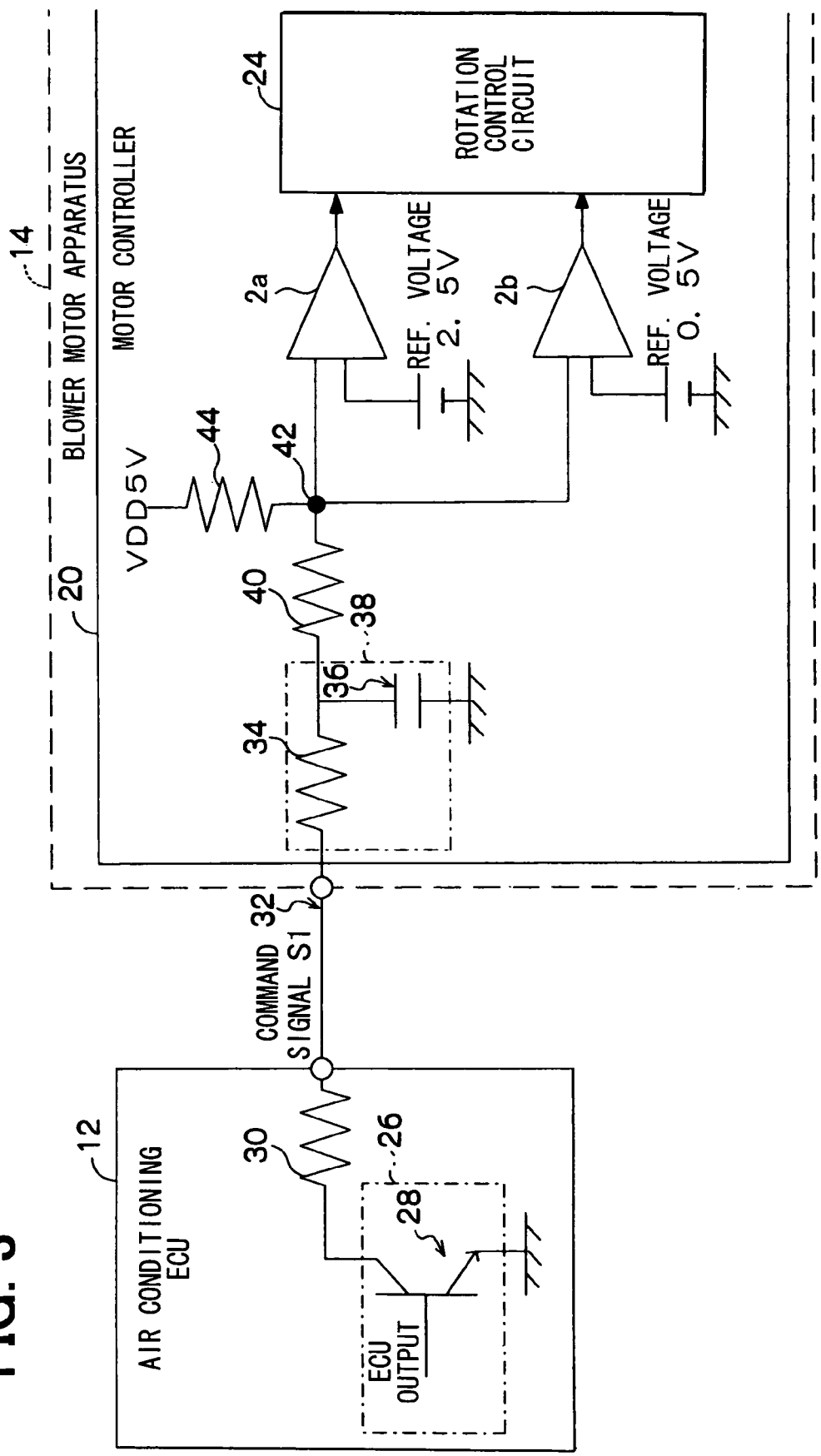
FIG. 3 is circuit diagram schematically showing a main feature of a motor control apparatus according to the first embodiment.

Now, the interface between the air conditioning ECU 12 and the blower motor apparatus 14 will be described in detail with reference to FIG. 3. The air conditioning ECU 12 has an output device 26. The output device 26 is a circuit that includes an NPN transistor 28. An emitter terminal of the transistor 28 is grounded, and a collector terminal of the transistor 28 is connected to an end of a command signal line 32 through a resistor (e.g., a resistor of 100Ω) 30. The motor controller 20 of the blower motor apparatus 14 is connected to the other end of the command signal line 32. In this way, as shown in FIG. 3, the air conditioning ECU 12 and the motor controller 20 are electrically interconnected.

Furthermore, a base terminal of the transistor 28 is connected to a signal generating circuit (not shown), which generates the command signal (ECU output) for driving the motor 18 based on the manipulation signal received from the manipulation switch at the air conditioning ECU 12. Thereby, the base terminal of the transistor 28 receives the command signal (ECU output), which is generated at the air conditioning ECU 12 based on the manipulation signal received from the manipulation switch to drive the motor 18. Therefore, when the low level signal is supplied to the base terminal of the transistor 28, the electrical conduction between the collector terminal and the emitter terminal of the transistor 28 is turned off (placed on a non-conductive state). When the high level signal is supplied to the base terminal of the transistor 28, the electrical conduction between the collector terminal and the emitter terminal of the transistor 28 is turned on (placed in a conductive state).

The motor controller 20 includes a filter circuit 38, which is an integrated circuit and has a resistor (e.g., a resistor of 30Ω) 34 and a capacitor (e.g., a capacitor of 1000 pF) 36. An input terminal of the filter circuit 38 is connected to the other end of the command signal line 32. An output terminal of the filter circuit 38 is connected to a connection terminal 42 through a resistor (e.g., a resistor of 180Ω) 40. One end of a pull-up resistor (e.g., a resistor of 2 kΩ) 44 is connected to the electric power source (e.g., the electric power source of 5 V) 16, and the other end of the pull-up resistor 44 is connected to the connection terminal 42. A non-inverting input terminal (upper terminal in FIG. 3) of a comparator 2a and a non-inverting input terminal (upper terminal in FIG. 3) of a comparator 2b are connected to the connection terminal 42. An inverting input terminal (lower terminal in FIG. 3) of the comparator 2a receives a voltage of a first predetermined value (first threshold value), for example, of 2.5 V, which serves as a comparative reference voltage, to obtain the duty ratio in the case of the normal level, i.e., undisturbed level of the drive command signal S1 (undisturbed state where no substantial disturbance exists). An inverting input terminal (lower terminal in FIG. 3) of the comparator 2b receives a voltage of a second predetermined value (second threshold value) of, for example, 0.5 V, which serves as a comparative reference voltage, to obtain the duty ratio in the disturbed state where the level of the drive command signal S1 is reduced in comparison to that of the undisturbed level (undisturbed state). An output terminal of the comparator 2a is connected to a corresponding input terminal of the rotation control circuit 24. An output terminal of the comparator 2b is connected to a corresponding input terminal of the rotation control circuit 24. The comparator 2a compares the first threshold value with an S1 electric potential (electric potential at the connection terminal 42). When the S1 electric potential is equal to or larger than the first threshold value, the high level signal is outputted from the output terminal of the comparator 2a. In contrast, when the S1 electric potential is smaller than the first threshold value, the low level signal is outputted from the output terminal of the comparator 2a. Similarly, the comparator 2b compares the second threshold value with the S1 electric potential. When the S1 electric potential is equal to or larger than the second threshold value, the high level signal is outputted from the output terminal of the comparator 2b. In contrast, when the S1 electric potential is smaller than the second threshold value, the low level signal is outputted from the output terminal of the comparator 2b.

Figure 4A:
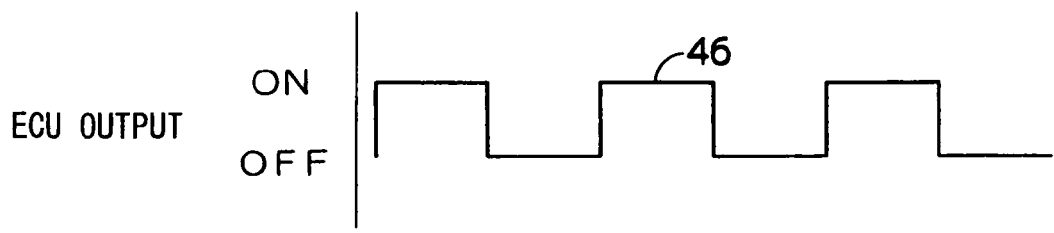
FIGS. 4A and 4B are diagrams for describing a first threshold value according to the first embodiment.
Figure 4B:
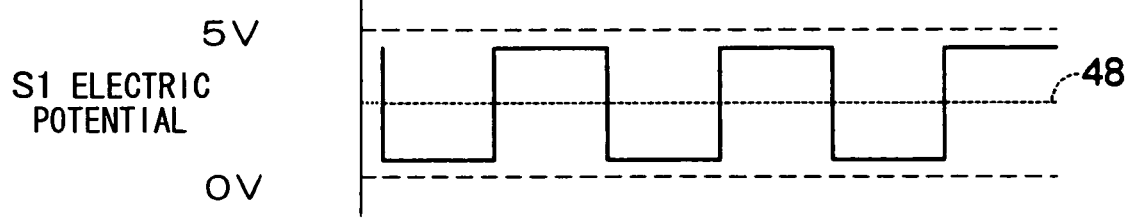

Now, the first predetermined value (first threshold value) and the second predetermined value (second threshold value) will be described with reference to FIGS. 4A to 5B. Under the ideal circumstance where the substantial disturbance, such as external radio wave radiation (e.g., radio wave radiation from a transceiver, which generates the radio wave), does not exist, when the signal (ECU output) 46 shown in FIG. 4A is supplied to the base terminal of the transistor 28, there is provided the S1 electric potential (electric potential at the connection terminal 42) shown in FIG. 4B. The electric potential, which corresponds to the ON state of the output of the ECU, does not become 0 (zero) V, i.e., does not completely drop to 0 (zero) V even though the pull-up resistor 44 is connected to the connection terminal 42. Also, the electric potential, which corresponds to the OFF state of the output of the ECU, does not become 5 V, i.e., does not completely rise to 5 V. These are mainly due to the presence of the resistance in the signal line. In such a case, based on the S1 electric potential, i.e., the drive command signal S1, the threshold value, based on which the duty ratio for driving the motor 18 is computable, is experimentally obtained and is preset as the first predetermined value (first threshold value) 48. For example, a period, during which the S1 electric potential is equal to or larger than the threshold value, may be set as an on-period. Also, a period, during which the S1 electric potential is smaller than the threshold value, may be set an off-period. In this way, it is possible to compute the duty ratio for driving the motor based on the S1 electric potential. In the following discussion of the present embodiment, it is assumed that the first threshold value is set to 2.5 V.

Figure 5A:
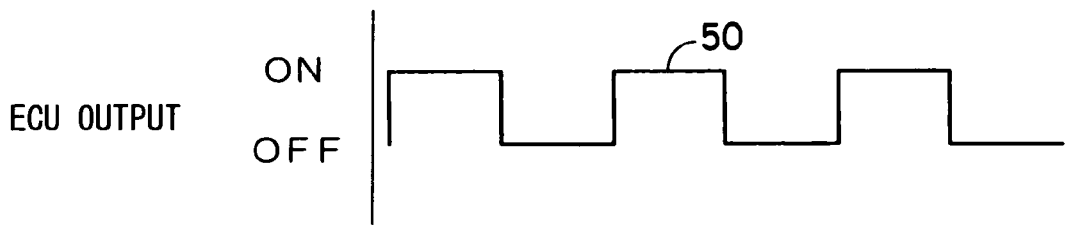
FIGS. 5A and 5B are diagrams for describing the first threshold value and a second threshold value according to the first embodiment.
Figure 5B:
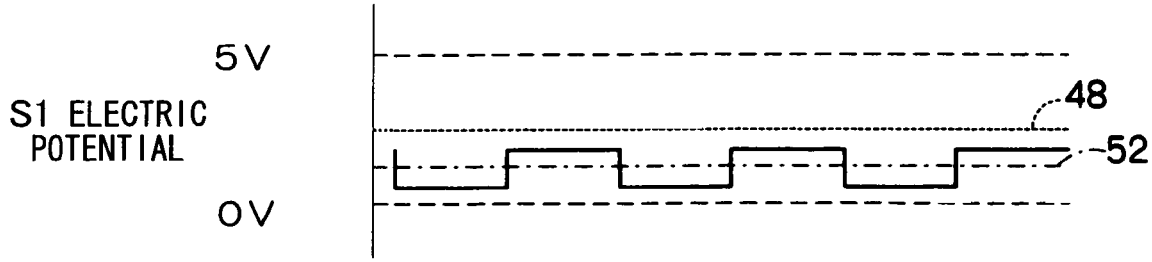

Furthermore, in the presence of the substantial disturbance, such as the external radio wave radiation, when the signal 50 of FIG. 5A (the signal, which is the same as the signal 46) is supplied to the base terminal of the transistor 28, the S1 electric potential may possibly entirely become below the first threshold value 48, as shown in FIG. 5B. This incidence is most likely caused by the following reason. That is, for example, when the external radio wave is applied to at least one of the command signal line 32 and the air conditioning ECU 12, the electric voltage is applied between the base terminal and the emitter terminal of the transistor 28 of the air conditioning ECU 12. Thereby, even when the signal, which is outputted to turn off the transistor 28, is supplied to the base terminal of the transistor 28, the voltage between the base terminal and the emitter terminal of the transistor 28 does not become 0 V. Thus, the transistor 28 is placed in the state where the transistor 28 is not completely turned off, i.e., is placed in a low on-state in such a case, even when the first threshold value 48 is used, it is not possible to accurately compute the duty ratio for driving the motor 18 based on the S1 electric potential. Specifically, in this state where the inverting input terminal of the comparator 2a receives the first threshold value 48 while the non-inverting input terminal of the comparator 2a is connected to the connection terminal 42, when the duty ratio is computed based on the S1 electric potential (i.e., the drive command signal S1) by using the signal outputted from the output terminal of the comparator 2a, the computed duty ratio becomes 0%. Therefore, the motor controller 20 controls the motor 18 such that the motor 18 is not rotated (i.e., is stopped). In view of the above disadvantage, according to the present embodiment, in the presence of the disturbance, as shown in FIG. 5B, the second predetermined value (second threshold value) 52 is previously obtained and set to a smaller value, which is smaller than the first threshold value and enables the computation of the duty ratio for driving the motor 18, based on the S1 electric potential. In the following discussion of the present embodiment, it is assumed that the second threshold value is set to 0.5 V.

Figure 6A:
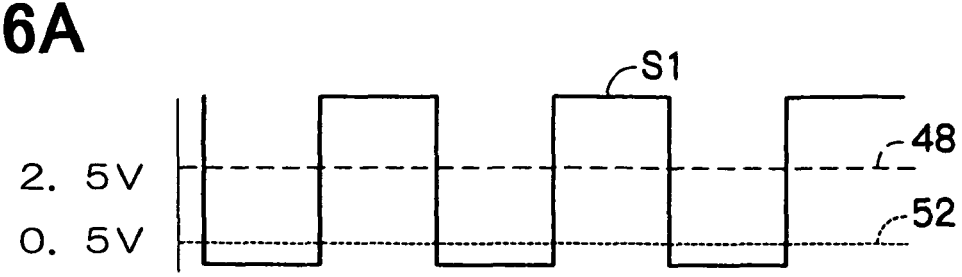
FIGS. 6A to 6C are diagrams for describing a signal supplied to a motor controller according to the first embodiment.

In the case where the above-described disturbance does not exist, when the command signal (the ECU output), which is for driving the motor 18 and is generated based on the manipulation signal received from the manipulation switch at the air conditioning ECU 12, is supplied to the base terminal of the transistor 28, the drive command signal (see FIG. 6A) is supplied to the comparators 2a, 2b as the drive command signal S1 from the air conditioning ECU 12. As shown in FIG. 6A, the drive command signal S1 is the signal, in which the high level is larger than the first threshold value 48, and the low level is smaller than the second threshold value 52. In the present embodiment, this drive command signal S1 is used as the drive command signal for the undisturbed state where the substantial disturbance (e.g. the radio wave radiation) does not exist.

Figure 6B:
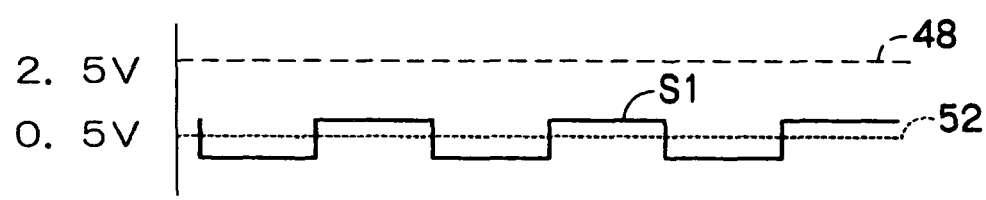

Furthermore, in the disturbed state where the substantial disturbance exists, when the command signal (the ECU output), which is for driving the motor 18 and is generated based on the manipulation signal received from the manipulation switch at the air conditioning ECU 12, is supplied to the base terminal of the transistor 28, the drive command signal of, for example, FIG. 6B is supplied to the comparators 2a, 2b, as the drive command signal S1 from the air conditioning ECU 12. As shown in FIG. 6B, the drive command signal S1 is the signal, in which the high level is smaller than the first threshold value 48 and is larger than the second threshold value 52, and the low level is smaller than the second threshold value 52. That is, this drive command signal S1 is the drive command signal used in the disturbed state where the level of the signal is reduced in comparison to the undisturbed state.

Figure 6C:
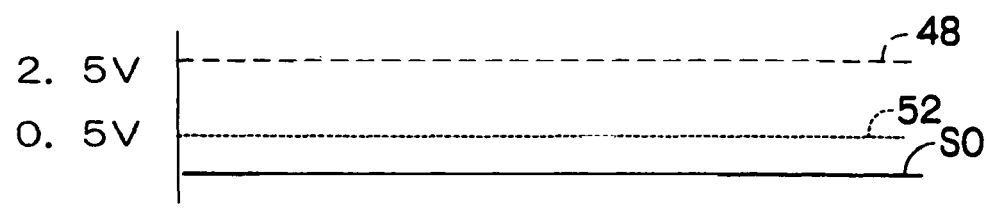

Furthermore, according to the present embodiment, in the case where the command signal (the ECU output) for driving the motor 18 is not generated in the air conditioning ECU 12 (i.e., in the case where the motor drive command does not exist), the transistor 28 is turned on, and the one end of the pull-up resistor 44, which has the other end connected to the electric power source 16, is connected to the connection terminal 42. Thereby, for example, the signal S0 of FIG. 6C, which indicates the absence of the motor drive command, is supplied to the comparators 2a, 2b. In the present embodiment, as shown in FIG. 6C, the signal S0 is smaller than the second threshold value 52.

In the present embodiment, the drive command signal S1 and the signal S0 are described as the rectangular wave voltage signals. Alternatively, these signals S1, S0 may be rectangular wave current signals.

Upon receiving the pulse signals from the comparators 2a, 2b, the rotation control circuit 24 computes the duty ratio of the pulse signal of the comparator 2a as the first duty ratio of the drive command signal S1 and also computes the duty ratio of the pulse signal of the comparator 2b as the second duty ratio of the drive command signal S1.

Also, the rotation control circuit 24 sets the duty ratio of the control signal S2 (the pulse signal) to the corresponding duty ratio (the control duty ratio) in such a manner that the rotational speed of the motor 18 coincides with the target rotational speed, which is indicated by the first duty ratio or the second duty ratio, and the rotation control circuit 24 outputs this duty ratio of the control signal S2 to the drive circuit 22.

Figure 7:
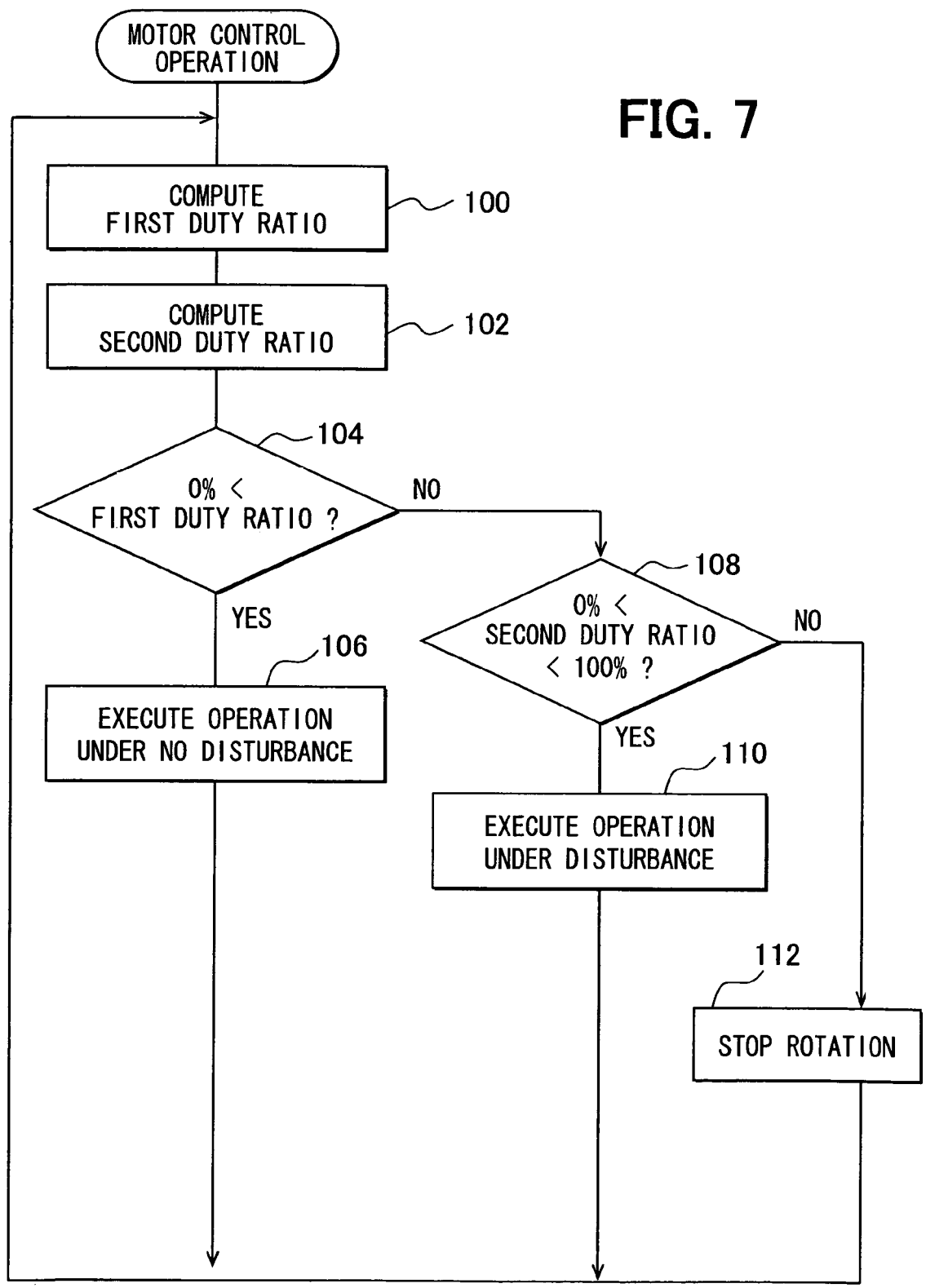
FIG. 7 is a flowchart showing a motor control operation executed by a rotation control circuit of the motor controller according to the first embodiment.

Next, the motor control operation, which is executed by the rotation control circuit 24, will be described with reference to FIG. 7. In the present embodiment, this motor control operation is executed upon turning on of the electric power supply switch (not shown) of the air conditioning system 10 to supply the electric power to the blower motor apparatus 14.

First, at step 100, the duty ratio of the pulse signal of the comparator 2a is computed as the first duty ratio of the drive command signal S1. Specifically, at step 100, the drive command signal S1, which has the pulse of the duty ratio that corresponds to the target rotational speed, is compared with the first threshold value, which is used to obtain the duty ratio in the undisturbed state where the level of the drive command signal S1 is normal, so that the first duty ratio of the drive command signal S1 is computed.

Then, at step 102, upon receiving the pulse signal of the comparator 2b, the duty ratio of the pulse signal of the comparator 2b is computed as the second duty ratio of the drive command signal S1. Specifically, at step 102, the drive command signal S1, which has the pulse of the duty ratio that corresponds to the target rotational speed, is compared with the second threshold value, which is used to obtain the duty ratio in the disturbed state where the level of the drive command signal S1 is reduced, so that the second duty ratio of the drive command signal S1 is computed.

Thereafter, at step 104, it is determined whether the first duty ratio, which is computed at step 100, is larger than 0%.

When it is determined that the first duty ratio is larger than 0% at step 104, the operation proceeds to step 106.

In the case where the operation proceeds to step 106, it has been determined that the first duty ratio is larger than 0% at step 104. Therefore, it is assumed that the current state is the state shown in FIG. 6A. That is, the current state is the state, in which the drive command signal S1 shown in FIG. 6A is supplied from the air conditioning ECU 12 to the comparators 2a, 2b as the drive command signal S1.

Then, at step 106, the duty ratio of the control signal S2 is set to a corresponding control duty ratio in such a manner that the rotational speed of the motor 18 coincides with the target rotational speed indicated by the first duty ratio, so that the control signal S2 is generated. Then, the generated control signal S2 is outputted to the drive circuit 22. Thereby, the corresponding drive signal S3 is outputted from the drive circuit 22 to the motor 18, so that the rotation of the motor 18 is controlled by the drive circuit 22. Then, the operation returns to step 100.

In contrast, when it is determined that the first duty ratio is 0% at step 104, the operation proceeds to step 108.

At step 108, it is determined whether the second duty ratio is greater than 0% and is smaller than 100%.

When it is determined that the second duty ratio is larger than 0% and is smaller than 100% at step 108, the operation proceeds to step 110. In the case where the operation proceeds to step 110, it has been determined that the first duty ratio is larger than 0% at step 104, and it has been determined that the second duty ratio is larger than 0% and is smaller than 100% at step 108. Therefore, it is assumed that the current state is the state shown in FIG. 6B. That is, the current state is the state, in which the drive command signal S1 shown in, for example, FIG. 6B is supplied from the air conditioning ECU 12 to the comparators 2a, 2b as the drive command signal S1.

At step 110, the duty ratio of the control signal S2 is set to the corresponding control duty ratio in such a manner that the rotational speed of the motor 18 coincides with the target rotational speed indicated by the second duty ratio, so that the control signal S2 is generated. Then, the generated control signal S2 is outputted to the drive circuit 22. Thereby, the corresponding drive signal S3 is outputted from the drive circuit 22 to the motor 18, so that the rotation of the motor 18 is controlled by the drive circuit 22. Then, the operation returns to step 100.

When it is determined that the second duty ratio is 0% or 100% at step 108, the operation proceeds to step 112. In the case where the operation proceeds to step 112, it is assumed that the current state is the state shown in FIG. 6C. That is, the current state is the state, in which the signal S0 shown in, for example, FIG. 6C is supplied from the air conditioning ECU 12 to the comparators 2a, 2b as the signal S0.

At step 112, the duty ratio of the control signal S2 is set to 0%, and then this control signal is outputted to the drive circuit 22. In this way, the motor 18 is controlled to prevent the rotation of the motor 18 (the rotation of the motor 18 being stopped in the case where the motor is rotated). Then, the operation returns to step 100.

Figure 8:
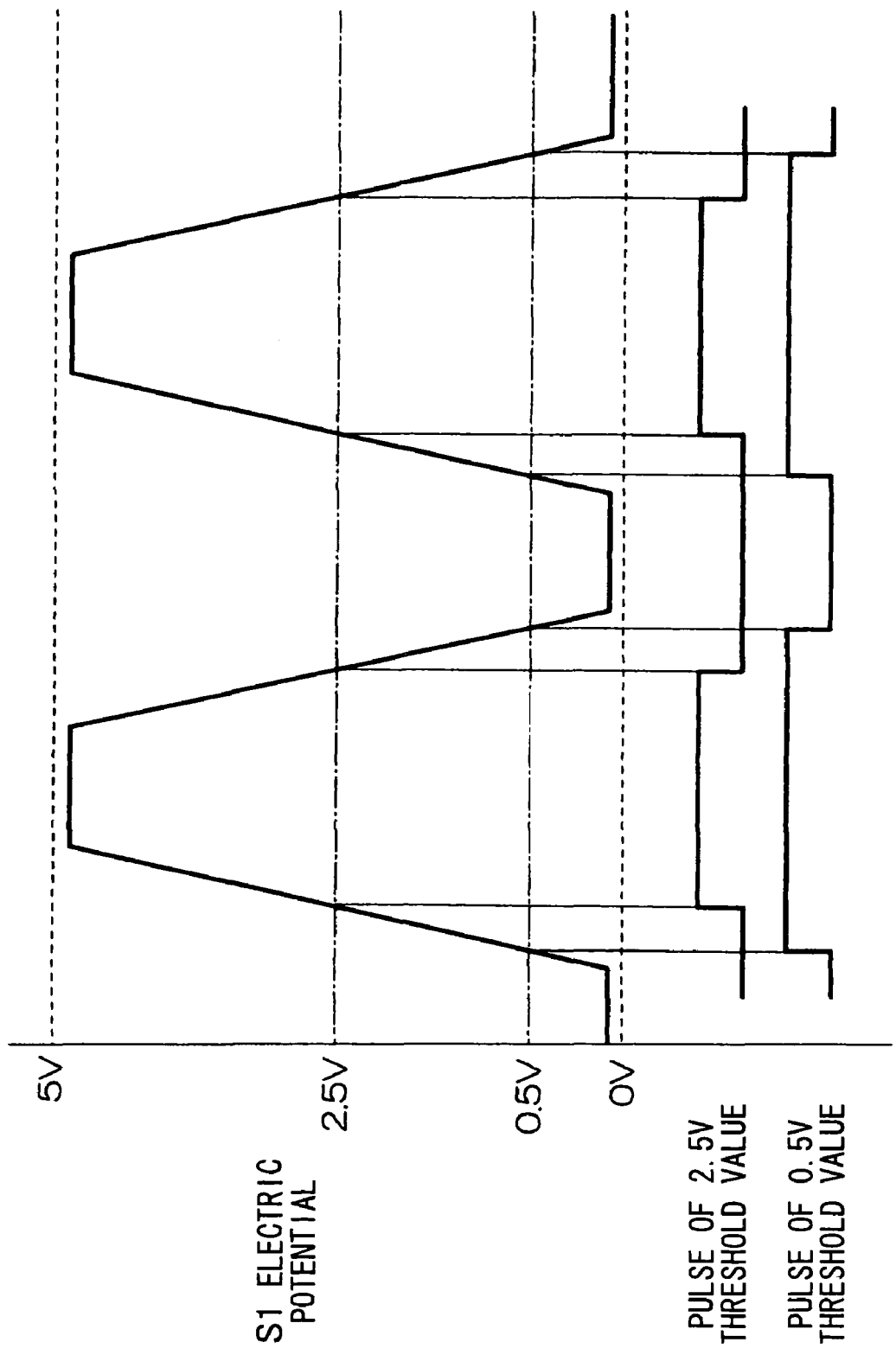
FIG. 8 is a diagram showing comparison between a first duty ratio computed by using the first threshold value and a second duty ratio computed by using the second threshold value.

The motor control operation of the present embodiment has been described. When the level of the drive command signal S1 is reduced, the threshold value is changed from the first threshold value to the second threshold value, and the duty ratio is computed by using the second threshold value. Therefore, as shown in FIG. 8, the duty ratio, which is computed by using the first threshold value, may possibly differ from the duty ratio, which is computed by using the second threshold value in some situations. Thus, it is desirable that the comparator 2b is operated only at the time of emergency, in which the disturbance exists. Alternatively, a relationship between the duty ratio, which is computed by using the second threshold value, and the duty ratio, which is computed by using the first threshold value that corresponds to the duty ratio computed by using the second threshold value, may be pre-stored in a storage means (e.g., a memory) for multiple numbers. Then, the stored relationship may be retrieved from the storage means to correct the duty ratio, which is computed by using the second threshold value, into the duty ratio, which is computed by using the corresponding first threshold value.

The first embodiment of the present invention has been described in detail. According to the first embodiment of the present invention, in the presence of the disturbance, such as the external radio wave radiation, when the level of the drive command signal S1 is reduced, the duty ratio of the drive command signal S1 is computed by using the second threshold value, which is set to obtain the duty ratio of the drive command signal S1 that has the reduced level. Therefore, the motor can be appropriately controlled without the need for using the harness having the shield structure or adding the ferrite bead for improving the resistance against the radio wave. Therefore, according to the embodiment of the present invention, the motor can be appropriately controlled at the low costs in the presence of the disturbance, such as the external radio wave radiation.

The present invention is not limited to the above embodiment, and the above embodiment may be modified in various ways within the scope of the present invention. For example, at step 110 of the above embodiment, the control signal, which has the pulse at the motor control duty ratio that corresponds to the second duty ratio, is generated. However, the present invention is not limited to this. For example, at step 110, a predetermined number of pulses, each of which has the motor control duty ratio that corresponds to the second duty ratio, may be generated such that the rotating time period of the motor 18, which is controlled by the drive circuit 22, becomes a predetermined time period (e.g., 15 seconds). Here, the number of pulses is set to rotate the motor 18 for the predetermined time period at the corresponding rotational speed, which corresponds to the second duty ratio. Then, after the generation of the predetermined number of pulses at the motor control duty ratio that corresponds to the second duty ratio, the control signal S2 having the pulse at the duty ratio (e.g., 0%) for stopping the rotation of the motor 18 may be generated. In this way, in the presence of the disturbance, such as the external radio wave radiation, the motor 18 is controlled to rotate until the lapse of the predetermined time period and then to stop the rotation of the motor 18.

Furthermore, it is possible to provide multiple threshold values, each of which is set to obtain the corresponding duty ratio in the disturbed state where the level of the drive command signal S1 is reduced from the undisturbed state. Specifically, in the above embodiment, the single threshold value (i.e., the second threshold value) is provided to obtain the duty ratio in the disturbed state where the level of the drive command signal S1 is reduced, and the single comparator 2b is used to obtain the duty ratio in the disturbed state where the level of the drive command signal S1 is reduced. Alternatively, the motor control apparatus may be provided with a plurality of comparators, which are connected to the rotation control circuit 24, and non-inverting input terminals of these comparators may be connected to the connection terminal 42, and the inverting terminals of these comparators may be supplied with the multiple threshold values, respectively. Then, at step 102, the drive command signal S1 is compared with the multiple threshold values, each of which is provided to obtain the corresponding duty ratio in the disturbed state where the level of the drive command signal S1 is reduced. In this way, multiple duty ratios, which respectively correspond to the multiple threshold values, are computed for the drive command signal S1. In such a case, at step 108, it is determined whether one or more of the computed duty ratios of the drive command signal S, which are computed at step 102, is larger than 0% and is smaller than 100%. When YES is returned at step 108, the operation proceeds to step 110. In contrast, when NO is returned at step 108, the operation proceeds to step 112. At step 110, the drive command signal S1 is compared with each corresponding threshold value that is used to compute the one or more of the duty ratios, which is determined to be larger than 0% and is smaller than 100% at step 108, and thereby there is generated the control signal that has the pulse with the corresponding duty ratio, which is determined to be larger than 0% and is smaller than 100% at step 108. That is, in the case where the high level of the drive command signal S1 is smaller than the first threshold value and is larger than any one of the multiple threshold values while the low level of the drive command signal S1 is smaller than this one of the multiple threshold values, the drive command signal S1 is compared with this one of the multiple threshold values to generate the control signal having the pulse at the corresponding motor control duty ratio, which corresponds to the duty ratio that is computed at step 102 and is determined to be larger than 0% and smaller than 100% at step 108. Thereby, in the presence of the disturbance, such as the external radio wave radiation, when the level of the drive command signal S1 is reduced, the duty ratio of the drive command signal S1 is computed by using the one of the multiple threshold values, which can be used to compute the duty ratio larger than 0%. Therefore, the motor can be appropriately controlled without the need for using the harness having the shield structure or adding the ferrite bead for improving the resistance against the radio wave. Therefore, the motor can be appropriately controlled at the low costs in the presence of the disturbance, such as the external radio wave radiation.

Even in this case, similar to the above described one, at step 110, a predetermined number of pulses, each of which has the motor control duty ratio that corresponds to the duty ratio that is computed at step 102 and is determined to be larger than 0% and smaller than 100% at step 108, may be generated such that the rotating time period of the motor 18, which is controlled by the drive circuit 22, becomes the predetermined time period (e.g., 15 seconds). Then, after the generation of the predetermined number of pulses with the motor control duty ratio that corresponds to the duty ratio that is computed at step 102 and is determined to be larger than 0% and smaller than 100% at step 108, the control signal S2 having the pulse with the duty ratio (e.g., 0%) for stopping the rotation of the motor 18 may be generated.

In the first embodiment, steps 100, 102, 104, 108 serve as a determining means. Furthermore, step 100 serves as a first duty ratio computing means, which is a part of the determining means, and step 102 serves as a second duty ratio computing means, which is another part of the determining means. In addition, steps 106, 110, 112 serve as a control signal generating means, and the drive circuit 22 serves as a drive means.

Second Embodiment

Now, a second embodiment of the present invention will be described with reference to FIGS. 9 to 13 in addition to FIGS. 1 to 3. In the second embodiment, components, which are similar to those of the first embodiment will be indicated by the same reference numerals and will not be described redundantly for the sake of simplicity. Furthermore, it should be noted that the structure of the air conditioning system 10 of the present embodiment is substantially the same as that of the first embodiment except the motor controller 20. Specifically, in the second embodiment, the motor controller 20 is adapted to execute a slow start operation and a motor inspection operation in addition to the operation discussed in the first embodiment. Therefore, in the following discussion, the slow start operation and the motor inspection operation will be mainly discussed.

Figure 9:
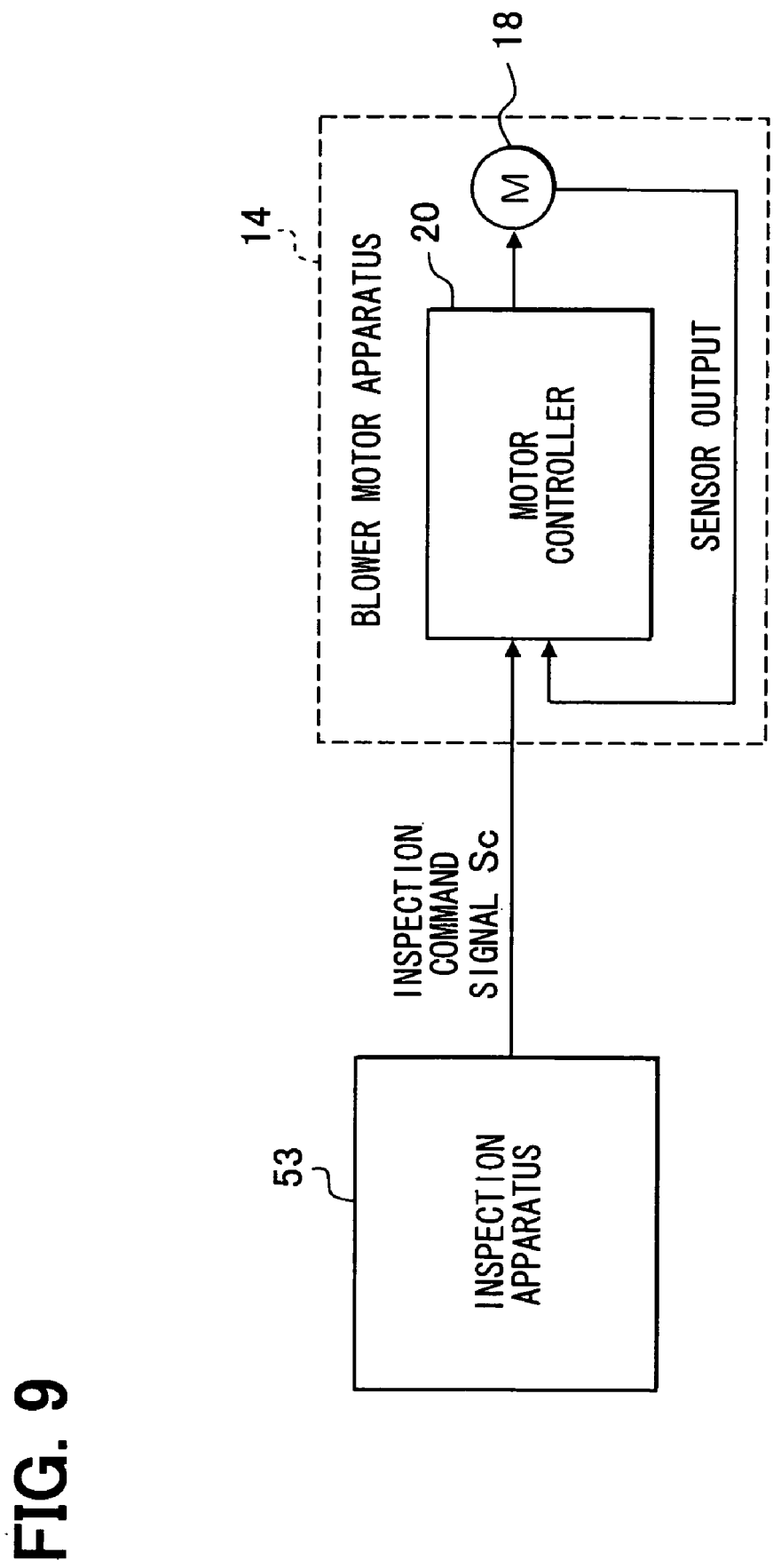
FIG. 9 is a descriptive diagram showing an inspection apparatus connected to a blower motor apparatus according to a second embodiment of the present invention.

The motor controller 20 executes the soft start operation of the motor 18 in the normal operation and also executes the inspection operation upon connection of an inspection apparatus 53 shown in FIG. 9 to the blower motor apparatus 14. The air conditioning ECU 12 provides the drive command signal (motor drive command signal) S1 of the normal operation command to the blower motor apparatus 14 based on the manipulation signal received from the manipulation switch (not shown), which is manipulated by a user. In the present embodiment, the blower motor apparatus 14 is constructed to perform its normal operation based on this drive command signal S1 like in the first embodiment.

Now, the soft start operation will be briefly discussed. With reference to FIGS. 1 to 3, when the motor controller 20 receives the drive command signal S1 (or an inspection drive command signal Sc described below) from the air conditioning ECU 12, the motor controller 20 outputs the drive signal S3 to the motor 18 to rotate the motor 18. In the case where the soft start operation is executed at the time of starting the rotation of the motor 18, the motor controller 20 controls the rotational speed of the motor 18 in such a manner that the motor rotational speed is increased from zero (stop state) to the corresponding motor rotational speed that corresponds to, i.e., is specified by the motor drive command signal S1.

The rotation control circuit 24 of the present embodiment includes one or more custom integrated circuits (ICs). In the case where the soft start control operation is executed, the rotation control circuit 24 outputs the control signal (PWM signal) S2 to the drive circuit 22 as follows. That is, the rotation control circuit 24 gradually increases the duty ratio of the control signal S2 from a predetermined value (e.g., 0% or close to 0%) and accomplishes the corresponding motor rotational speed, which is the target value set by the drive command signal S1.

Figure 10A:
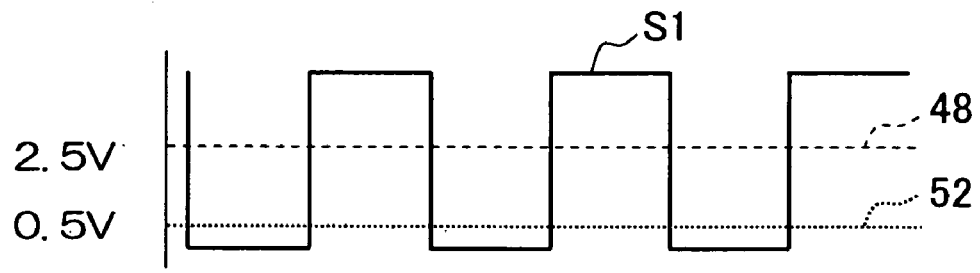
FIGS. 10A to 10D are diagrams for describing a signal supplied to a motor controller according to the second embodiment.

In the undisturbed state where the substantial disturbance, which is discussed in detail in the first embodiment, does not exist, when the command signal (the ECU output), which is for driving the motor 18 and is generated based on the manipulation signal received from the manipulation switch at the air conditioning ECU 12, is supplied to the base terminal of the transistor 28 (i.e., at the time of the normal operation), the drive command signal of the normal operation command (see FIG. 10A) is supplied to the comparators 2a, 2b as the drive command signal S1 from the air conditioning ECU 12. As shown in FIG. 10A, the normal operation drive command signal S1 is the signal, in which the high level is larger than the first threshold value 48, and the low level is smaller than the second threshold value 52. That is, the normal operation drive command signal S1 is the signal that is set such that the high level is larger than the first threshold value 48 while the low level is smaller than the second threshold value 52.

Figure 10B:
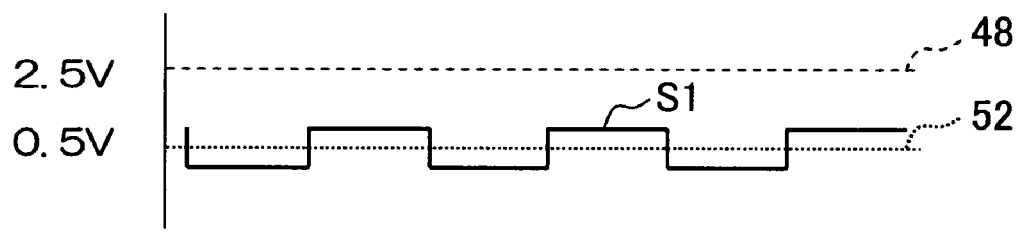

Furthermore, in the disturbed state where the above-described disturbance exists, when the command signal (the ECU output), which is for driving the motor 18 and is generated based on the manipulation signal received from the manipulation switch at the air conditioning ECU 12, is supplied to the base terminal of the transistor 28, the normal operation drive command signal (see FIG. 10B) is supplied to the comparators 2a, 2b as the drive command signal S1 from the air conditioning ECU 12. As shown in FIG. 10B, under the presence of the disturbance, the normal operation drive command signal is the signal, in which the high level is smaller than the first threshold value 48 and is larger than the second threshold value 52, and the low level is smaller than the second threshold value 52.

Furthermore, as shown in FIG. 9, at the time of manufacturing the blower motor apparatus 14, the inspection apparatus 53 is connected to an input terminal of the filter circuit 38 and outputs the inspection drive command signal Sc to the motor controller 20 to execute the maximum output inspection of the motor 18. This drive command signal Sc of the inspection drive command is the preset signal. For example, the drive command signal Sc is preset such that the high level of the drive command signal Sc is larger than the first threshold value 48, and the low level of the drive command signal Sc is smaller than the first threshold value 48 and is larger than the second threshold value 52. In the case where no disturbance exists, when the drive command signal Sc is supplied to the motor controller 20 (i.e., at the time of inspection), the inspection drive command signal Sc (see FIG. 10C) is supplied from the inspection apparatus 53 to the comparators 2a, 2b. That is, the drive command signal Sc of the inspection drive command is the signal that is set such that the high level of the inspection drive command signal Sc is larger than the first threshold value 48, and the low level of the inspection drive command signal Sc is smaller than the first threshold value 48 and is larger than the second threshold value 52.

Figure 10C:
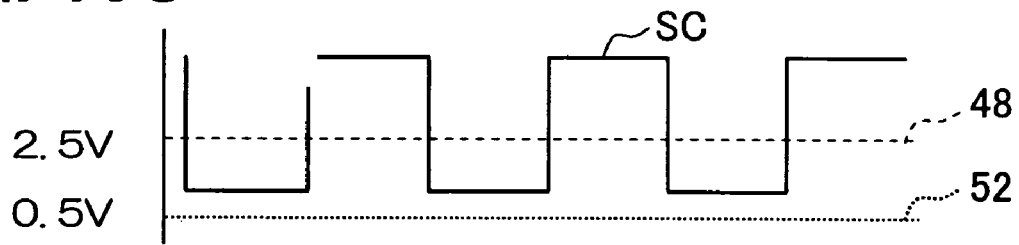
Figure 10D:
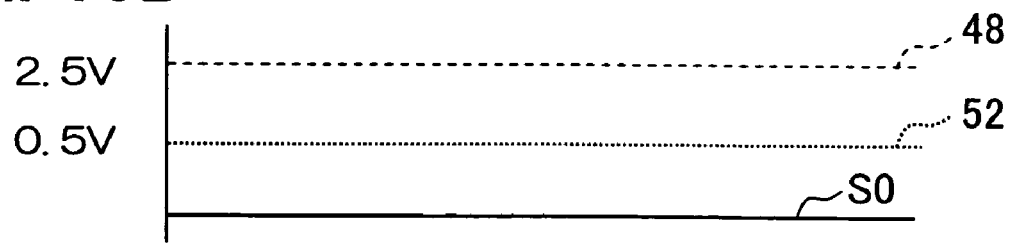

Furthermore, according to the present embodiment, in the case where the command signal (the ECU output) for driving the motor 18 is not generated in the air conditioning ECU 12 (i.e., in the case where the motor drive command does not exist), the transistor 28 is turned on, and the one end of the pull-up resistor 44, which has the other end connected to the electric power source 16, is connected to the connection terminal 42. Thereby, for example, the signal S0 of FIG. 10D, which indicates the absence of the motor drive command, is supplied to the comparators 2a, 2b. In the present embodiment, as shown in FIG. 10D, the signal S0 is smaller than the second threshold value 52.

In the present embodiment, the drive command signal S1, the drive command signal Sc and the signal S0 are described as the rectangular wave voltage signals. Alternatively, the drive command signal S1, the drive command signal Sc and the signal S0 may be rectangular wave current signals.

The rotation control circuit 24 receives the pulse signals from the comparators 2a, 2b and computes the information (characteristics) about the pulse signals, such as the duty ratio of the pulse signal from the comparator 2a and the duty ratio of the pulse signal from the comparator 2b.

Figure 12A:
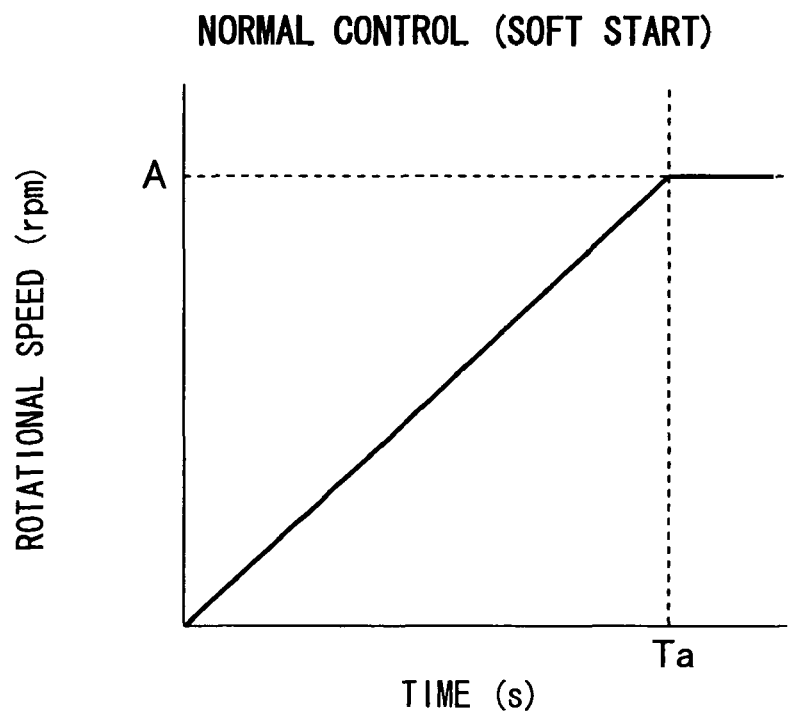
FIGS. 12A and 12B are diagrams showing a change in a rotational speed of a motor at start time according to the second embodiment.

Furthermore, as described in detail below, the rotation control circuit 24 compares the respective drive command signals S1, Sc with each corresponding predetermined threshold value (the first threshold value 48 and the second threshold value 52 in the present embodiment) to determine whether the drive command signal S1, SC is of the inspection drive command or of the normal operation drive command. Then, when the rotation control circuit 24 determines that the drive command signal is of the normal operation drive command, the rotation control circuit 24 determines that the requested mode is the normal operation mode. Therefore, as shown in FIG. 11A, the rotation control circuit 24 gradually increases the duty ratio of the control signal S2, which is the pulse signal, from the predetermined value (e.g., 0% or around 0%) to the duty ratio of the normal operation (normal operation duty ratio), which causes the rotation of the motor 18 at the target rotational speed indicated by the computed duty ratio of the pulse signal received from the comparator 2a. Once the normal operation duty ratio is reached, the rotation control circuit 24 maintains the normal duty ratio and thereby generates the control signal S2 as the normal operation control signal. The rotation control circuit 24 outputs this control signal S2 to the drive circuit 22. As described above, at the start time of the motor 18 in the normal operational mode, the duty ratio of the control signal S2 is gradually increased from the predetermined value (e.g., 0% or around 0%) to the normal duty ratio, which implements the motor rotational speed according to the duty ratio of the drive command signal S1. In the exemplary case of FIG. 11A, the control signal S2 is outputted at pulse intervals T2. At the beginning of the signal output, there is provided the pulse width T1$_0$. This pulse width T1$_0$ is then gradually increased to the pulse width T1$_1$ and is finally increased to the pulse width T1$_2$, which is the target value. In this way, the energization time period for supplying the electric power to the windings of the motor 18 per unit time is gradually increased by the drive signal S3 supplied from the drive circuit 22, and the rotational speed of the motor 18 is increased from zero (the stop state) to the target rotational speed at the time Ta, as shown in FIG. 12A.

Figure 12B:
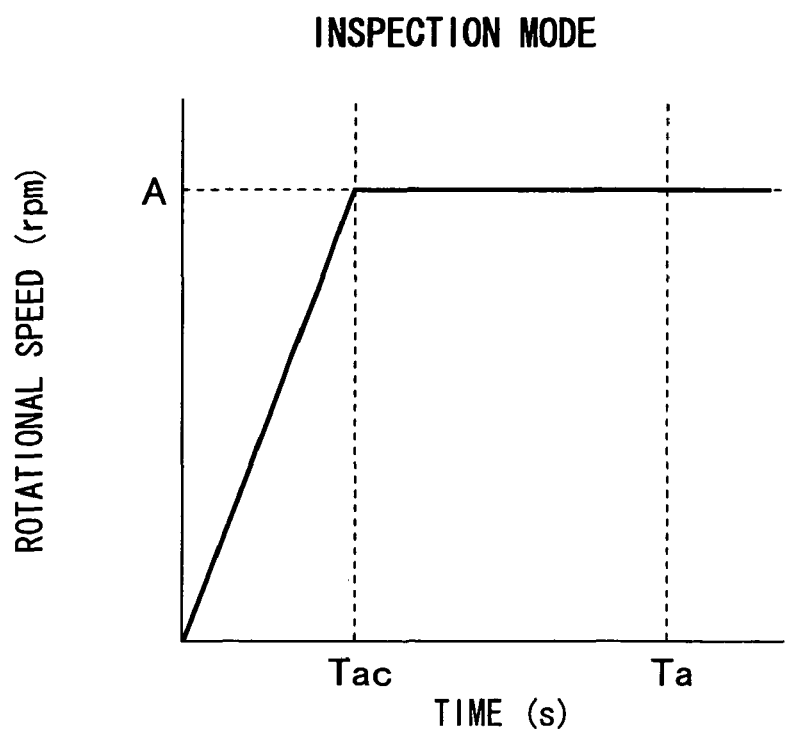

In contrast, when the rotation control circuit 24 determines that the drive command signal is of the inspection drive command, the rotation control circuit 24 determines that the requested mode is the inspection mode. Therefore, as shown in FIG. 11B, the rotation control circuit 24 sets the duty ratio of the control signal S2, which is the pulse signal, to the duty ratio of the inspection operation (inspection duty ratio), which causes the rotation of the motor 18 at the target rotational speed indicated by the duty ratio of the pulse signal received from the comparator 2a. Thus, the rotation control circuit 24 generates the control signal S2 as the inspection control signal and outputs this control signal S2 to the drive circuit 22. That is, as shown in FIG. 11B, in the inspection mode, the control signal S2 having the pulse width T1, which is the target value, is outputted at the pulse intervals T2 from the begging of the signal output. Here, the pulse width T1 shown in FIG. 11B is the value that implements the duty ratio, which corresponds to the maximum output inspection. As shown in FIG. 12B, in the inspection mode, the rotational speed of the motor 18 can be increased to the motor rotational speed A within a shorter time period Tac, which is shorter than the time period Ta. As discussed above, in the second embodiment, at the time of inspection, the rotational speed of the motor 18 is quickly increased from the stop state to the predetermined motor rotational speed without executing the soft start to shorten the inspection time period. In other words, in the soft start operation (FIG. 12A), the rotational speed of the motor 18 is increased at the rate, which is smaller than that of the inspection operation (FIG. 12B).

Figure 13:
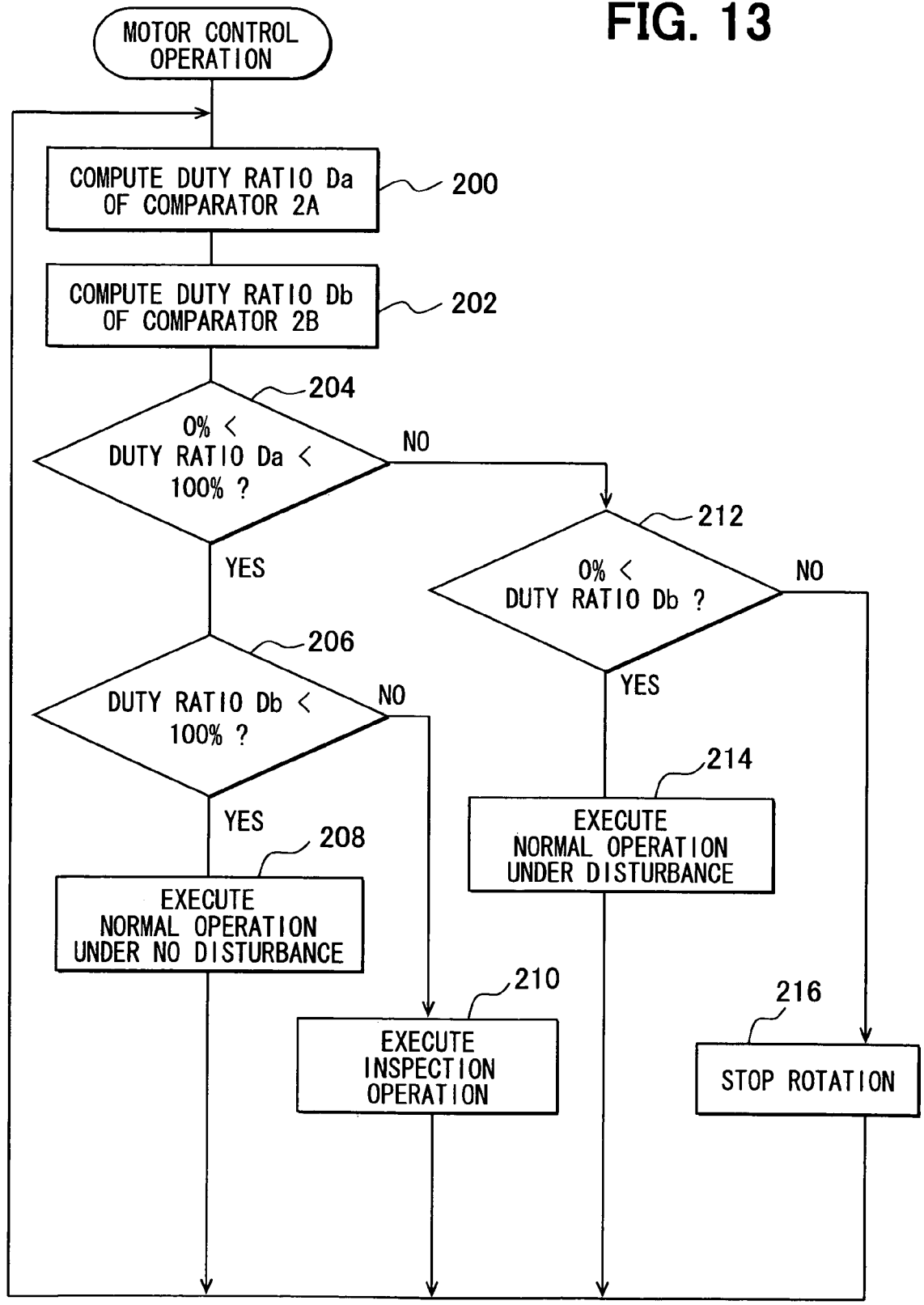
FIG. 13 is a flowchart showing a motor-control operation executed by a rotation control circuit of the motor controller according to the second embodiment.

Next, the motor control operation, which is executed by the rotation control circuit 24, will be described with reference to FIG. 13. In the present embodiment, this motor control operation is executed upon turning on of the electric power supply switch (not shown) of the air conditioning system 10 to supply the electric power to the blower motor apparatus 14.

First, at step 200, upon receiving the pulse signal from the comparator 2a, the duty ratio (first duty ratio) Da of the pulse signal of the comparator 2a is computed.

Then, at step 202, upon receiving the pulse signal of the comparator 2b, the duty ratio (second duty ratio) Db of the pulse signal of the comparator 2b is computed.

Thereafter, at step 204, it is determined whether the duty ratio Da computed at step 200 is larger than 0% and is smaller than 100% (i.e., determining whether the duty ratio, Da is not one of 0% and 100%).

When it is determined that the duty ratio Da is larger than 0% and is smaller than 100%, the operation proceeds to step 206.

Thereafter, at step 206, it is determined whether the duty ratio Db, which is computed at step 202, is smaller than 100%.

When it is determined that the duty ratio Db is smaller than 100% at step 206, the operation proceeds to step 208. In the case where the operation proceeds to step 208, it has been determined that the duty ratio Da is larger than 0% and is smaller than 100% at step 204, and it has been determined that the duty ratio Db is smaller than 100% at step 206. Therefore, it is assumed that the current state is the state shown in FIG. 1A. That is, it is the case where the drive command signal of the normal operation command shown in, for example, FIG. 10A is supplied as the drive command signal S1 from the air conditioning ECU 12 to the comparators 2a, 2b.

At step 208, as shown in FIG. 11A, the duty ratio of the control signal S2, which is the pulse signal, is gradually increased from the predetermined value (e.g., 0% or around 0%) to the duty ratio of the normal operation. (normal operation duty ratio), which causes the rotation of the motor 18 at the target rotational speed indicated by the duty ratio (the normal duty ratio) computed at step 200. Once the normal duty ratio is reached, this duty ratio is maintained and thereby the control signal S2 is generated as the normal operation control signal. The generated control signal S2 is outputted to the drive circuit 22. In this way, the energization time period for supplying the electric power to the windings of the motor 18 per unit time is gradually increased by the drive signal S3 supplied from the drive circuit 22, and the rotational speed of the motor 18 is increased from zero (the stop state) to the target rotational speed at the time Ta, as shown in FIG. 12A. That is, the drive circuit 22 controls the rotational speed of the motor 18 based on the generated control signal S2. Then, the operation returns to step 200.

In contrast, when it is determined that the duty ratio Db is 100% at step 206, the operation proceeds to step 210. In the case where the operation proceeds to step 210, it has been determined that the duty ratio Da is larger than 0% and is smaller than 100% at step 204, and it has been determined that the duty ratio Db is 100% at step 206. Therefore, it is assumed that the current state is the state shown in FIG. 10C. That is, it is the case where the drive command signal Sc of the inspection command shown in, for example, FIG. 10C is supplied as the drive command signal Sc from the air conditioning ECU 12 to the comparators 2a, 2b.

At step 210, as shown in FIG. 11B, the duty ratio of the control signal S2, which is the pulse signal, is set to the corresponding inspection duty ratio to rotate the motor 18 at the target rotational speed, which is indicated by the duty ratio Da computed at step 200. Thereby, the control signal S2 of the inspection control signal is generated, and this control signal S2 is outputted to the drive circuit 22. That is, as shown in FIG. 11B, in the inspection mode, the control signal S2 having the pulse width T1, which is the target value, is outputted at the pulse intervals T2 from the begging of the signal output. Here, the drive circuit 22 controls the rotational speed of the motor 18 based on the generated control signal S2. Furthermore, the pulse width T1 shown in FIG. 11B is the value that implements the duty ratio, which corresponds to the maximum output characteristic inspection. As shown in FIG. 12B, in the inspection mode, the rotational speed of the motor 18 can be increased to the motor rotational speed A within the shorter time period Tac, which is shorter than the time period Ta. As discussed above, in the present embodiment, at the time of inspection, the rotational speed of the motor 18 is quickly increased from the stop state to the predetermined motor rotational speed without executing the soft start to shorten the inspection time period. Then, the operation returns to step 200.

That is, at steps 204, 206, the drive command signal S1 is compared with the corresponding predetermined value (the first threshold value and the second threshold value in the present embodiment), and it is determined whether the drive command signal is of the inspection drive command or of the normal operation drive command. Here, when it is determined that the drive command signal is of the inspection drive command, the operation proceeds to step 210. In contrast, when it is determined that the drive command signal is of the normal operation drive command, the operation proceeds to step 208.

The above determination process is less expensive in comparison to the case of the microcomputer and can be implemented without increasing the chip size even in the case of the custom integrated circuit (IC), which may result in the increase in the chip size at the time of accomplishing the determination method recited in Japanese Unexamined Patent Publication No. 2006-320164A. Thus, in comparison to the case where the microcomputer, which is provided with the previously proposed determination function, it is possible to reduce the costs without increasing the chip size in the case where the custom IC is used in the motor controller 20.

When it is determined that the duty ratio Da is 0% or 100% at step 204, the operation proceeds to step 212.

At step 212, it is determined whether the duty ratio Db, which is computed at step 202, is larger than 0%.

When it is determined that the duty ratio Db is larger than 0% at step 212, the operation proceeds to step 214. In the case where the operation proceeds to step 214, it has been determined that the duty ratio Da is 0% or 100% at step 204, and it has been determined that the duty ratio Db is larger than 0% at step 212. Therefore, it is assumed that the current state is the state shown in FIG. 10B. That is, it is the case where the drive command signal S1 of the normal operation shown in, for example, FIG. 10B is supplied as the drive command signal S1 from the air conditioning ECU 12 to the comparators 2a, 2b in the state where the above-described disturbance exists.

At step 214, as shown in FIG. 11A, the duty ratio of the control signal S2, which is the pulse signal, is gradually increased from the predetermined value (e.g., 0% or around 0%) to the duty ratio of the normal operation (normal operation duty ratio), which causes the rotation of the motor 18 at the target rotational speed indicated by the duty ratio Db of the pulse signal of the comparator 2b computed at step 202. Once the duty ratio is reached, this duty ratio is maintained and thereby the control signal S2 is generated as the normal operation control signal. The generated control signal S2 is outputted to the drive circuit 22. In this way, the energization time period for supplying the electric power to the windings of the motor 18 per unit time is gradually increased by the drive signal S3 supplied from the drive circuit 22, and the rotational speed of the motor 18 is increased from zero (the stop state) to the target rotational speed at the time Ta, as shown in FIG. 12A. Then, the operation returns to step 200.

When it is determined that the duty ratio Db is 0% at step 212, the operation proceeds to step 216. In the case where the operation proceeds to step 216, it is assumed that the current state is the state shown in FIG. 10D. That is, the current state is the state, in which the signal S0 shown in, for example, FIG. 10D is supplied from the air conditioning ECU 12 to the comparators 2a, 2b as the signal S0.

At step 216, the duty ratio of the control signal S2 is set to 0%, and then this control signal is outputted to the drive circuit 22. In this way, the motor 18 is not started (the rotation of the motor 18 being stopped in the case where the motor is rotated). Then, the operation returns to step 200.

The second embodiment of the present invention has been described in detail. The present invention is not limited to the above embodiment, and the above embodiment may be modified in various ways within the scope of the present invention. For example, in the second embodiment, the degree of the low level differs between the drive command signal of the inspection drive command and the drive command signal of the normal operation command. Alternatively, at least one of the high level and the low level of the drive command signal may differ between the inspection drive command and the normal operation drive command.

Figure 14:
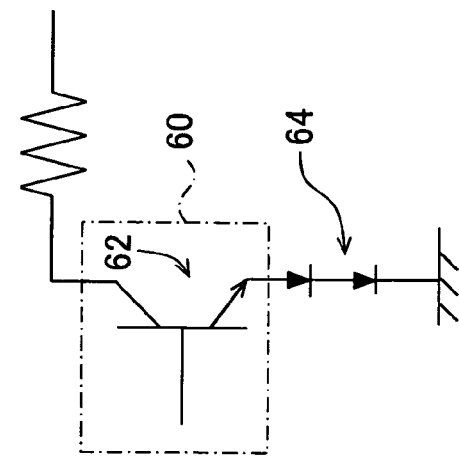
FIG. 14 is a descriptive diagram showing a modification of the second embodiment.
Figure 15:
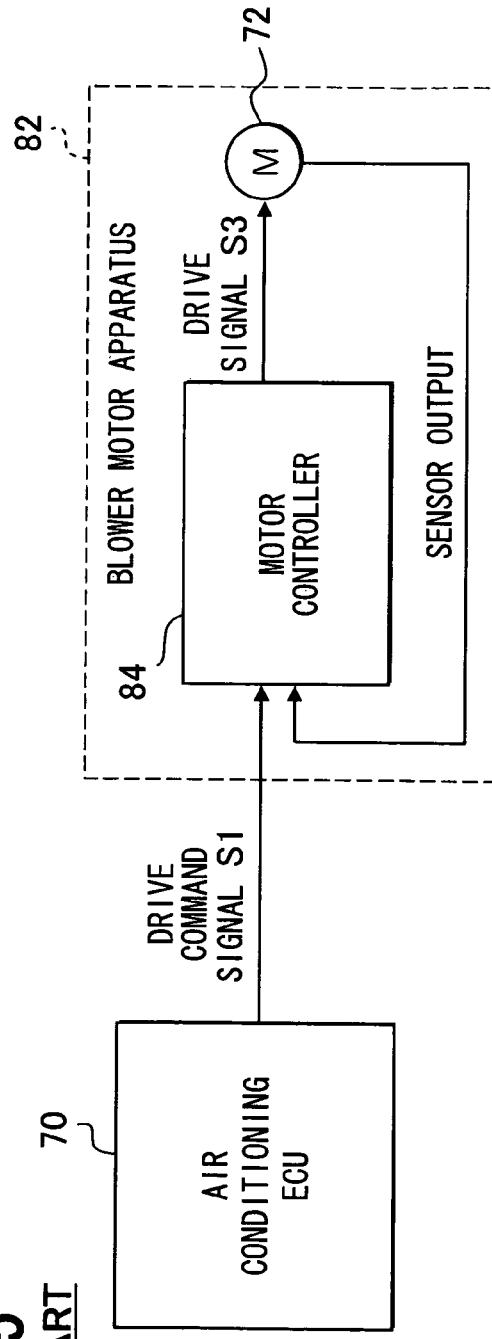
FIG. 15 is a descriptive diagram showing a previously proposed air conditioning system.
Figure 16:
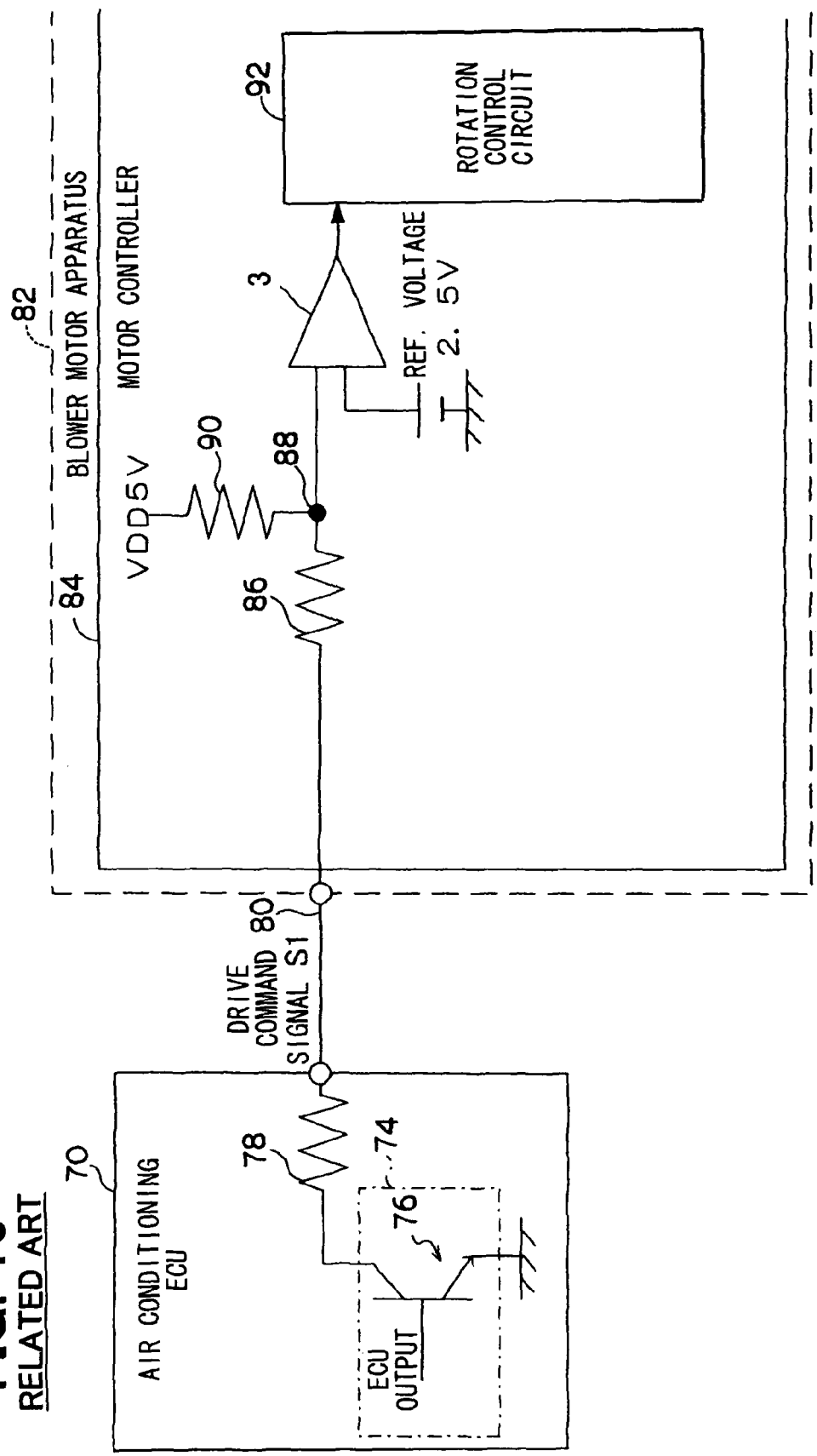
FIG. 16 is a circuit diagram showing the previously proposed technique.
Figure 17A:
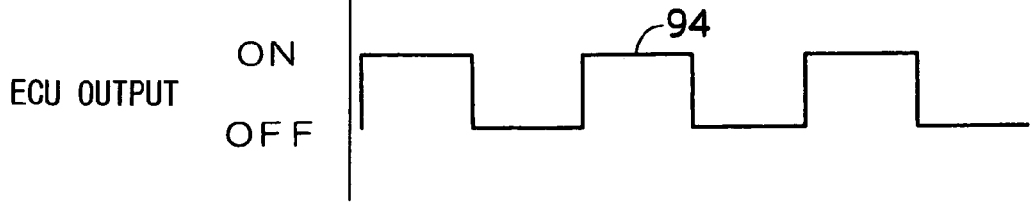
FIGS. 17A and 17B are descriptive diagrams showing the previously proposed technique.
Figure 17B:
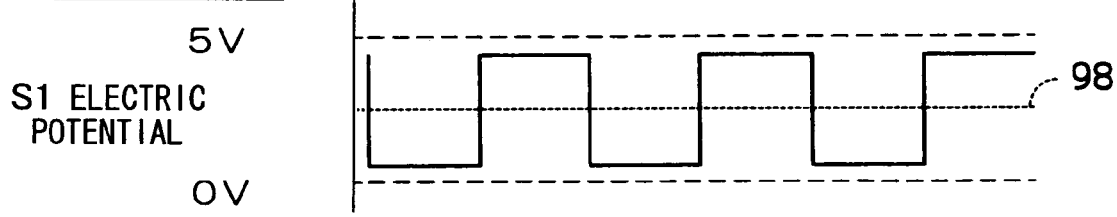
Figure 18A:
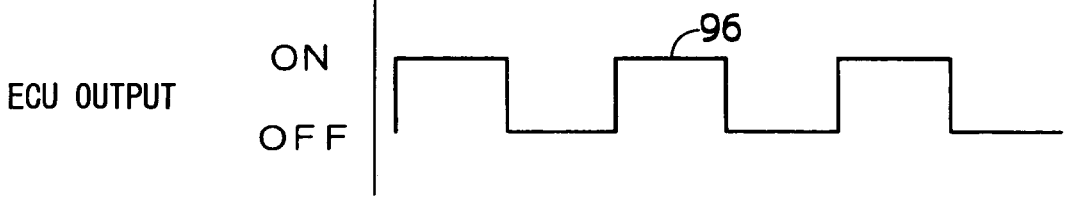
FIGS. 18A and 18B are descriptive diagrams showing the previously proposed technique.
Figure 18B:
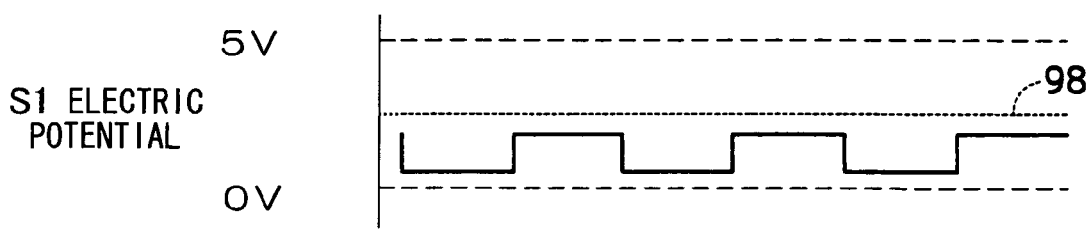

Furthermore, the drive command signal Sc, which is outputted from inspection apparatus 53, may be generated by executing a program, which generates the drive command signal Sc of the inspection drive command, in which the high level is larger than the first threshold value, and the low level is smaller than the first threshold value and is larger than the second threshold value. Alternatively, as shown in FIG. 14, the emitter of the transistor 62, which is provided in the output device 60 that outputs the drive command signal Sc of the inspection apparatus 53, may be grounded through one or more diodes 64 to generate the drive command signal Sc of the inspection drive command, in which the low level is larger than the second threshold value.

Furthermore, in the second embodiment, the drive command signal is compared with each corresponding threshold value once to determine whether the drive command signal is of the inspection drive command or of the normal drive command. Alternatively, the drive command signal may be compared with each corresponding threshold value for a predetermined number of times (e.g., 10 times) to determine whether the drive command signal is of the inspection drive command or of the normal operation drive command for the predetermined number of times. Then, only when a ratio of the number of time(s), in each of which the drive command signal is determined as the drive command signal of the inspection drive command, relative to the predetermined number of times (the total number of times) is equal to or larger than a predetermined value (e.g., 0.5), it may be determined that the drive command signal is of the inspection drive command. In this way, when the predetermined number of times is set to an appropriate value, at which the determination accuracy and the required determination process time are balanced, it is possible to reduce the required determination process time, and the determination accuracy becomes appropriate.

Furthermore, in order to limit the occurrence of the erroneous determination of whether the drive command signal is of the inspection drive command or of the normal operation command due to, for example, the external noise, it is possible to change the frequency between the inspection drive command signal and the normal operation drive command signal. Also, it is possible to execute a weighted average process to limit data skipping in the respective duty ratios computed based on the signal from the comparators 2a, 2b. Also, it is possible to execute a data coincidence determination process to cancel the chattering noises at the time of the pulse shaping. Furthermore, it is possible to provide a filter (e.g., capacitor) and the hysteresis characteristic to the input of the comparators 2a, 2b in order to eliminate the influences of the chattering. Also, any two or more of the above processes may be combined in an appropriate manner.

In the second embodiment, steps 200, 202, 204, 206, 212 serve as a determining means. Furthermore, step 200 serves as a first duty ratio computing means, which is a part of the determining means, and step 202 serves as a second duty ratio computing means, which is another part of the determining means. In addition, steps 208, 210, 214 serve as a control signal generating means.

Additional advantages and modifications will readily occur to those skilled in the art. The invention in its broader terms is therefore not limited to the specific details, representative apparatus, and illustrative examples shown and described.

What is claimed is:

1. A motor control apparatus for an electric motor, comprising:
a determining means for determining at least one characteristic of a drive command signal, which is pulsed and specifies a target rotational speed of the electric motor, by comparing a level of the drive command signal with a plurality of threshold values;
a control signal generating means for generating a control signal based on the at least one characteristic of the drive command signal, which is determined by the determining means; and
a drive means for driving the electric motor based on the control signal, which is generated by the control signal generating means, wherein:
the determining means includes:
a first duty ratio computing means for computing a first duty ratio of the drive command signal as the at least one characteristic of the drive command signal by comparing the level of the drive command signal with a first threshold value, which is one of the plurality of threshold values and is preset for an undisturbed state where the level of the drive command signal is normal; and
a second duty ratio computing means for computing a second duty ratio of the drive command signal as the at least one characteristic of the drive command signal by comparing the level of the drive command signal with a second threshold value, which is another one of the plurality of threshold values set to be smaller than the first threshold value and is for a disturbed state where the level of the drive command signal is reduced from that of the undisturbed state; and the control signal generating means generates the control signal, which has a pulse at a motor control duty ratio that corresponds to one of the first duty ratio and the second duty ratio, wherein the control signal generating means generates the control signal at the first duty ratio when a high level of the drive command signal is larger than the first threshold value, and the control signal generating means generates the control signal at the second duty ratio when the high level of the drive command signal is smaller than the first threshold value and is larger than the second threshold value while a low level of the drive command signal is smaller than the second threshold value.

2. The motor control apparatus according to claim 1, wherein the control signal generating means generates a predetermined number of pulses at the motor control duty ratio, which corresponds to the second duty ratio, to rotate the electric motor through the drive means for a predetermined time period, and thereafter generates the control signal at a duty ratio, which stops the rotation of the electric motor upon satisfaction of the following conditions:

the high level of the drive command signal is smaller than the first threshold value and is larger than the second threshold value; and the low level of the drive command signal is smaller than the second threshold value.

3. The motor control apparatus according to claim 1, wherein:

the drive command signal is supplied from an external air conditioning electronic control unit to the motor control apparatus though a signal line; and the second threshold value is set to obtain the duty ratio of the drive command signal in the disturbed state where the level of the drive command signal is reduced from that of the undisturbed state due to radiation of a radio wave on at least one of the signal line and the air conditioning electronic control unit.

4. A motor control apparatus, for an electric motor comprising:

a determining means for determining at least one characteristic of a drive command signal, which is pulsed and specifies a target rotational speed of the electric motor, by comparing a level of the drive command signal with a plurality of threshold values;

a control signal generating means for generating a control signal based on the at least one characteristic of the drive command signal, which is determined by the determining means; and a drive means for driving the electric motor based on the control signal, which is generated by the control signal generating means, wherein:

the determining means determines whether the drive command signal is of an inspection drive command or of a normal operation drive command based on the at least one characteristic of the drive command signal;

the control signal generating means generates an inspection control signal as the control signal when the determining means determines that the drive command signal is of the inspection drive command;

the control signal generating means generates a normal operation control signal as the control signal when the determining means determines that the drive command signal is of the normal operation drive command;

the drive means increases a rotational speed of the electric motor at a first rate at time of starting rotation of the electric motor in a case where the drive means receives the inspection control signal from the control signal generating means; and the drive means increases the rotational speed of the electric motor at a second rate, which is smaller than the first rate, at the time of starting the rotation of the electric motor in a case where the drive means receives the normal operation control signal from the control signal generating means.

5. The motor control apparatus according to claim 4, wherein:

the determining means compares the level of the drive command signal with the plurality of threshold values for a predetermined number of times; and the determining means determines that the drive command signal is of the inspection drive command only when a ratio of the number of times, in each of which the drive command signal is determined as the drive command signal of the inspection drive command, relative to the predetermined number of times is equal to or larger than a predetermined value.

6. The motor control apparatus according to claim 4, wherein:

the determining means determines that the drive command signal is of the inspection drive command when a high level of the drive command signal is larger than a first threshold value, which is one of the plurality of threshold values, while a low level of the drive command signal is smaller than the first threshold value and larger than a second threshold value, which is another one of the plurality of threshold values and is smaller than the first threshold value; and the determining means determines that the drive command signal is of the normal operation drive command when the high level of the drive command signal is larger than the first threshold value while the low level of the drive command signal is smaller than the second threshold value.

7. The motor control apparatus according to claim 4, wherein the control signal generating means increases a duty ratio of the normal operation control signal from zero to a normal operation duty ratio, which corresponds to the target rotational speed of the electric motor specified by the drive command signal, and then maintains the normal operation duty ratio.

8. A motor control method comprising:

determining at least one characteristic of a drive command signal, which is pulsed and specifies a target rotational speed of an electric motor, by comparing a level of the drive command signal with a plurality of threshold values;

generating a control signal based on the at least one characteristic of the drive command signal; and driving the electric motor based on the control signal, wherein:

the determining of the at least one characteristic of the drive command signal includes:

computing a first duty ratio of the drive command signal by comparing the level of the drive command signal with a first threshold value, which is one of the plurality of threshold values and is preset for an undisturbed state where the level of the drive command signal is normal; and computing a second duty ratio of the drive command signal by comparing the level of the drive command signal with a second threshold value, which is another one of the plurality of threshold values set to be smaller than the first threshold value and is for a disturbed state where the level of the drive command signal is reduced from that of the undisturbed state; and the generating of the control signal includes generating the control signal, which has a pulse at a motor control duty ratio that corresponds to one of the first duty ratio and the second duty ratio, wherein the control signal, which has the pulse at the motor control duty ratio that corresponds to the first duty ratio, is generated when a high level of the drive command signal is larger than the first threshold value, and the control signal, which has the pulse at the motor control duty ratio that corresponds to the second duty ratio, is generated when the high level of the drive command signal is smaller than the first threshold value and is larger than the second threshold value while a low level of the drive command signal is smaller than the second threshold value.

9. A motor control method comprising:

determining at least one characteristic of a drive command signal, which is pulsed and specifies a target rotational speed of an electric motor, by comparing a level of the drive command signal with a plurality of threshold values;

generating a control signal based on the at least one characteristic of the drive command signal; and driving the electric motor based on the control signal, wherein:

the determining of the at least one characteristic of the drive command signal includes determining whether the drive command signal is of an inspection drive command or of a normal operation drive command by comparing the level of the drive command signal with the plurality of threshold values;

the generating of the control signal includes:

generating an inspection control signal as the control signal when the drive command signal is determined to be of the inspection drive command; and generating a normal operation control signal as the control signal when the drive command signal is determined to be of the normal operation drive command; and the driving of the electric motor includes:

increasing a rotational speed of the electric motor at a first rate at time of starting rotation of the electric motor in a case where the inspection control signal is generated as the control signal; and increasing the rotational speed of the electric motor at a second rate, which is smaller than the first rate, at the time of starting the rotation of the electric motor in a case where the normal operation control signal is generated as the control signal.

\* \* \* \* \*